United States Patent
Munro, Jr. et al.

(10) Patent No.: US 9,189,568 B2
(45) Date of Patent: Nov. 17, 2015

(54) METHOD AND SYSTEM TO DISPLAY AND SEARCH IN A LANGUAGE INDEPENDENT MANNER

(75) Inventors: W. Barton Munro, Jr., San Jose, CA (US); Dan Pritchett, San Jose, CA (US); Louis Monier, Menlo Part, CA (US)

(73) Assignee: eBay Inc., San Jose, CA (US)

( * ) Notice: Subject to any disclaimer, the term of this patent is extended or adjusted under 35 U.S.C. 154(b) by 728 days.

(21) Appl. No.: 10/831,421

(22) Filed: Apr. 23, 2004

(65) Prior Publication Data

US 2005/0240392 A1    Oct. 27, 2005

(51) Int. Cl.
*G06F 17/28* (2006.01)
*G06F 17/30* (2006.01)

(52) U.S. Cl.
CPC .............................. *G06F 17/30976* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ......... 704/1–10; 707/1–6, 706–708; 715/265, 715/264
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,811,199 A | 3/1989 | Kuechler et al. | |
| 4,823,265 A | 4/1989 | Nelson | |
| 4,864,516 A | 9/1989 | Gaither et al. | |
| 4,903,201 A | 2/1990 | Wagner | |
| 5,063,507 A | 11/1991 | Lindsey et al. | |
| 5,063,523 A | 11/1991 | Vrenjak | |
| 5,077,665 A | 12/1991 | Silverman et al. | |
| 5,101,353 A | 3/1992 | Lupien | |

(Continued)

FOREIGN PATENT DOCUMENTS

| | | |
|---|---|---|
| CA | 2253543 | 3/1997 |
| FR | 2658635 | 2/1991 |

(Continued)

OTHER PUBLICATIONS

"Andale Lister, http://www.andale.com/corp/products/sell.jsp.", (Dec. 18, 2002),1-3.
"Andale Lister: Bulk List, http://www.andale.com/corp/products/qs_sell_details_bulklist.jsp.", (Dec. 18, 2002),p. 1.
"Andale Lister: In-line Images, http://www.andale.com/corp/products/qs_sell_detals_inlineimg.jsp.", (Dec. 18, 2002),1-2.

(Continued)

*Primary Examiner* — Lamont Spooner
(74) *Attorney, Agent, or Firm* — Schwegman Lundberg & Woessner, P.A.

(57) ABSTRACT

A method to facilitate a language independent search includes displaying a search attribute, including an attribute name and a selection of attribute values, to a user and receiving from the user a search attribute value selection corresponding to the attribute name. Then, the attribute name and attribute value selection are translated into language independent symbols, such as numbers. The numbers are used in a search of a sellers item listings table to select item listings with attribute values that match the search attribute values selected by the user.

18 Claims, 13 Drawing Sheets

(56) References Cited

U.S. PATENT DOCUMENTS

| | | | |
|---|---|---|---|
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,339,391 A | 8/1994 | Wroblewski et al. | |
| 5,349,368 A * | 9/1994 | Takeda et al. | 345/684 |
| 5,375,055 A | 12/1994 | Togher et al. | |
| 5,384,701 A | 1/1995 | Stentiford et al. | |
| 5,392,428 A | 2/1995 | Robins | |
| 5,394,324 A | 2/1995 | Clearwater | |
| 5,418,949 A | 5/1995 | Suzuki | |
| 5,421,008 A | 5/1995 | Banning et al. | |
| 5,426,281 A | 6/1995 | Abecassis | |
| 5,434,978 A | 7/1995 | Dockter et al. | |
| 5,442,546 A | 8/1995 | Kaji et al. | |
| 5,442,782 A * | 8/1995 | Malatesta et al. | 1/1 |
| 5,479,600 A | 12/1995 | Wroblewski et al. | |
| 5,485,510 A | 1/1996 | Colbert | |
| 5,497,319 A | 3/1996 | Chong et al. | |
| 5,515,488 A | 5/1996 | Hoppe et al. | |
| 5,535,403 A | 7/1996 | Li et al. | |
| 5,544,051 A * | 8/1996 | Senn et al. | 1/1 |
| 5,553,145 A | 9/1996 | Micali | |
| 5,557,728 A | 9/1996 | Garrett et al. | |
| 5,590,325 A | 12/1996 | Kolton et al. | |
| 5,592,668 A | 1/1997 | Harding et al. | |
| 5,596,994 A | 1/1997 | Bro | |
| 5,598,557 A | 1/1997 | Doner et al. | |
| 5,600,833 A * | 2/1997 | Senn et al. | 1/1 |
| 5,606,691 A | 2/1997 | Watts et al. | |
| 5,627,979 A | 5/1997 | Chang et al. | |
| 5,640,569 A | 6/1997 | Miller et al. | |
| 5,652,896 A | 7/1997 | Yamauchi et al. | |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | |
| 5,696,909 A | 12/1997 | Wallner | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,715,466 A * | 2/1998 | Flanagan et al. | 704/5 |
| 5,717,989 A | 2/1998 | Tozzoli et al. | |
| 5,721,897 A | 2/1998 | Rubinstein | |
| 5,722,418 A | 3/1998 | Bro | |
| 5,724,524 A | 3/1998 | Hunt et al. | |
| 5,724,593 A * | 3/1998 | Hargrave et al. | 704/7 |
| 5,727,165 A | 3/1998 | Ordish et al. | |
| 5,758,333 A | 5/1998 | Bauer et al. | |
| 5,768,581 A | 6/1998 | Cochran | |
| 5,771,291 A | 6/1998 | Newton et al. | |
| 5,771,380 A | 6/1998 | Tanaka et al. | |
| 5,778,213 A | 7/1998 | Shakib et al. | |
| 5,778,356 A | 7/1998 | Heiny | |
| 5,787,386 A | 7/1998 | Kaplan et al. | |
| 5,790,790 A | 8/1998 | Smith et al. | |
| 5,794,219 A | 8/1998 | Brown | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,826,258 A | 10/1998 | Gupta | |
| 5,832,452 A | 11/1998 | Schneider et al. | |
| 5,835,896 A | 11/1998 | Fisher et al. | |
| 5,835,911 A | 11/1998 | Nakagawa et al. | |
| 5,838,965 A | 11/1998 | Kavanagh et al. | |
| 5,841,437 A | 11/1998 | Fishkin et al. | |
| 5,842,203 A | 11/1998 | D'Elena et al. | |
| 5,845,143 A | 12/1998 | Yamauchi et al. | |
| 5,845,265 A | 12/1998 | Woolston | |
| 5,845,266 A | 12/1998 | Lupien et al. | |
| 5,850,442 A | 12/1998 | Muftic | |
| 5,857,188 A | 1/1999 | Douglas | |
| 5,857,201 A | 1/1999 | Wright et al. | |
| 5,857,203 A | 1/1999 | Kauffman et al. | |
| 5,870,722 A | 2/1999 | Albert et al. | |
| 5,872,848 A | 2/1999 | Romney et al. | |
| 5,873,069 A | 2/1999 | Reuhl et al. | |
| 5,884,056 A | 3/1999 | Steele | |
| 5,884,246 A | 3/1999 | Boucher et al. | |
| 5,884,247 A | 3/1999 | Christy | |
| 5,890,138 A | 3/1999 | Godin et al. | |
| 5,905,974 A | 5/1999 | Fraser et al. | |
| 5,905,975 A | 5/1999 | Ausubel | |
| 5,909,544 A | 6/1999 | Anderson et al. | |
| 5,909,678 A | 6/1999 | Bergman et al. | |
| 5,911,138 A | 6/1999 | Li et al. | |
| 5,913,215 A | 6/1999 | Rubinstein et al. | |
| 5,917,484 A | 6/1999 | Mullaney | |
| 5,922,074 A | 7/1999 | Richard et al. | |
| 5,924,072 A | 7/1999 | Havens | |
| 5,926,794 A | 7/1999 | Fethe | |
| 5,933,145 A | 8/1999 | Meek | |
| 5,944,790 A | 8/1999 | Levy | |
| 5,960,382 A | 9/1999 | Steiner | |
| 5,966,685 A | 10/1999 | Flanagan et al. | |
| 5,974,412 A | 10/1999 | Hazelhurst et al. | |
| 5,991,739 A | 11/1999 | Cupps et al. | |
| 6,006,221 A * | 12/1999 | Liddy et al. | 1/1 |
| 6,012,055 A | 1/2000 | Campbell et al. | |
| 6,018,742 A | 1/2000 | Herbert, III | |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,055,518 A | 4/2000 | Franklin et al. | |
| 6,058,379 A | 5/2000 | Odom et al. | |
| 6,058,417 A | 5/2000 | Hess et al. | |
| 6,061,448 A | 5/2000 | Smith et al. | |
| 6,069,939 A | 5/2000 | Fung et al. | |
| 6,073,117 A | 6/2000 | Oyanagi et al. | |
| 6,077,085 A | 6/2000 | Parry et al. | |
| 6,085,169 A | 7/2000 | Walker et al. | |
| 6,085,176 A | 7/2000 | Woolston | |
| 6,092,035 A | 7/2000 | Kurachi et al. | |
| 6,092,037 A | 7/2000 | Stone et al. | |
| 6,104,815 A | 8/2000 | Alcorn et al. | |
| 6,111,574 A | 8/2000 | Meek | |
| 6,119,137 A | 9/2000 | Smith et al. | |
| 6,119,229 A | 9/2000 | Martinez et al. | |
| 6,122,606 A | 9/2000 | Johnson | |
| 6,134,533 A | 10/2000 | Shell | |
| 6,141,653 A | 10/2000 | Conklin et al. | |
| 6,151,589 A | 11/2000 | Aggarwal et al. | |
| 6,161,082 A | 12/2000 | Goldberg | |
| 6,178,408 B1 | 1/2001 | Copple et al. | |
| 6,189,003 B1 | 2/2001 | Leal | |
| 6,192,407 B1 | 2/2001 | Smith et al. | |
| 6,202,051 B1 | 3/2001 | Woolston | |
| 6,205,418 B1 * | 3/2001 | Li et al. | 704/8 |
| 6,226,412 B1 | 5/2001 | Schwab | |
| 6,243,094 B1 | 6/2001 | Sklar | |
| 6,243,691 B1 | 6/2001 | Fisher et al. | |
| 6,243,699 B1 | 6/2001 | Fish | |
| 6,266,651 B1 | 7/2001 | Woolston | |
| 6,266,652 B1 | 7/2001 | Godin et al. | |
| 6,275,789 B1 * | 8/2001 | Moser et al. | 704/7 |
| 6,278,969 B1 | 8/2001 | King et al. | |
| 6,282,507 B1 | 8/2001 | Horiguchi et al. | |
| 6,285,998 B1 | 9/2001 | Black et al. | |
| 6,286,002 B1 | 9/2001 | Axaopoulos et al. | |
| 6,292,769 B1 | 9/2001 | Flanagan et al. | |
| 6,301,554 B1 | 10/2001 | Christy | |
| 6,308,172 B1 | 10/2001 | Agrawal et al. | |
| 6,326,962 B1 | 12/2001 | Szabo | |
| 6,326,985 B1 | 12/2001 | Tazoe et al. | |

(56) References Cited

U.S. PATENT DOCUMENTS

| | | |
|---|---|---|
| 6,336,105 B1 | 1/2002 | Conklin et al. |
| 6,339,755 B1 | 1/2002 | Hetherington et al. |
| 6,341,958 B1 | 1/2002 | Zilberman |
| 6,345,271 B1 | 2/2002 | Dempsey et al. |
| 6,345,273 B1 | 2/2002 | Cochran |
| 6,347,320 B1 | 2/2002 | Christensen et al. |
| 6,349,275 B1 | 2/2002 | Schumacher et al. |
| 6,356,865 B1 | 3/2002 | Franz et al. |
| 6,363,337 B1 | 3/2002 | Amith |
| 6,389,427 B1 | 5/2002 | Faulkner |
| 6,396,515 B1 | 5/2002 | Hetherington et al. |
| 6,397,212 B1 | 5/2002 | Biffar |
| 6,405,175 B1 | 6/2002 | Ng |
| 6,415,270 B1 | 7/2002 | Rackson et al. |
| 6,415,282 B1 | 7/2002 | Mukherjea et al. |
| 6,434,545 B1 | 8/2002 | MacLeod et al. |
| 6,434,546 B1 | 8/2002 | Williamowski et al. |
| 6,438,524 B1 | 8/2002 | Shi |
| 6,460,015 B1 | 10/2002 | Hetherington et al. |
| 6,463,404 B1 | 10/2002 | Appleby |
| 6,466,931 B1 | 10/2002 | Attaluri et al. |
| 6,473,729 B1 | 10/2002 | Gastaldo et al. |
| 6,487,553 B1 | 11/2002 | Emens et al. |
| 6,493,661 B1 | 12/2002 | White et al. |
| 6,496,793 B1 | 12/2002 | Veditz et al. |
| 6,507,813 B2 | 1/2003 | Veditz et al. |
| 6,515,656 B1 | 2/2003 | Wittenburg et al. |
| 6,516,329 B1 | 2/2003 | Smith |
| 6,523,000 B1 | 2/2003 | Ando et al. |
| 6,523,037 B1 | 2/2003 | Monahan et al. |
| 6,526,426 B1 * | 2/2003 | Lakritz .......................... 715/264 |
| 6,529,896 B1 | 3/2003 | Leung et al. |
| 6,532,444 B1 | 3/2003 | Weber |
| 6,549,941 B1 | 4/2003 | Jaquith et al. |
| 6,567,821 B1 | 5/2003 | Polk |
| 6,570,591 B1 | 5/2003 | Crovetto et al. |
| 6,571,241 B1 | 5/2003 | Nosohara |
| 6,574,239 B1 | 6/2003 | Dowling et al. |
| 6,598,026 B1 | 7/2003 | Ojha et al. |
| 6,601,071 B1 | 7/2003 | Bowker et al. |
| 6,604,107 B1 * | 8/2003 | Wang ............................ 707/740 |
| 6,616,703 B1 | 9/2003 | Nakagawa |
| 6,623,529 B1 | 9/2003 | Lakritz |
| 6,640,221 B1 | 10/2003 | Levine et al. |
| 6,647,364 B1 | 11/2003 | Yumura et al. |
| 6,651,220 B1 * | 11/2003 | Penteroudakis et al. ....... 715/236 |
| 6,658,404 B1 | 12/2003 | Cecchini |
| 6,671,681 B1 | 12/2003 | Emens et al. |
| 6,694,321 B1 | 2/2004 | Berno |
| 6,694,326 B2 | 2/2004 | Mayhew et al. |
| 6,711,565 B1 | 3/2004 | Subramaniam et al. |
| 6,721,715 B2 | 4/2004 | Nemzow |
| 6,732,161 B1 | 5/2004 | Hess et al. |
| 6,768,997 B2 | 7/2004 | Schirmer et al. |
| 6,778,193 B2 | 8/2004 | Biebesheimer et al. |
| 6,778,993 B2 | 8/2004 | Wang |
| 6,785,671 B1 | 8/2004 | Bailey et al. |
| 6,857,022 B1 | 2/2005 | Scanlan |
| 6,859,217 B2 | 2/2005 | Robertson et al. |
| 6,876,997 B1 | 4/2005 | Rorex et al. |
| 6,901,408 B2 * | 5/2005 | Fachat et al. .................. 707/798 |
| 6,912,539 B1 | 6/2005 | Kapitanski et al. |
| 6,915,308 B1 | 7/2005 | Evans et al. |
| 6,925,608 B1 | 8/2005 | Neale et al. |
| 6,947,928 B2 | 9/2005 | Dettinger et al. |
| 6,965,882 B1 | 11/2005 | Lapstun et al. |
| 6,970,883 B2 | 11/2005 | Ku et al. |
| 6,983,270 B2 | 1/2006 | Rippich |
| 6,999,932 B1 * | 2/2006 | Zhou ............................. 704/277 |
| 7,007,026 B2 | 2/2006 | Wilkinson et al. |
| 7,013,289 B2 * | 3/2006 | Horn et al. .................. 705/14.51 |
| 7,031,985 B1 | 4/2006 | Pecheny |
| 7,072,826 B1 | 7/2006 | Wakita |
| 7,133,835 B1 | 11/2006 | Fusz et al. |
| 7,136,863 B2 * | 11/2006 | Wang ........................... 705/26.1 |
| 7,165,041 B1 | 1/2007 | Guheen et al. |
| 7,181,438 B1 | 2/2007 | Szabo |
| 7,185,000 B1 | 2/2007 | Brown et al. |
| 7,188,105 B2 | 3/2007 | Dettinger et al. |
| 7,191,393 B1 | 3/2007 | Chin et al. |
| 7,194,403 B2 | 3/2007 | Okura et al. |
| 7,234,110 B2 | 6/2007 | Sumitomo |
| 7,251,612 B1 | 7/2007 | Parker et al. |
| 7,296,033 B1 | 11/2007 | Lynch |
| 7,315,613 B2 | 1/2008 | Kleindienst et al. |
| 7,315,826 B1 | 1/2008 | Guheen et al. |
| 7,340,389 B2 | 3/2008 | Vargas |
| 7,346,526 B2 | 3/2008 | Daughtrey et al. |
| 7,383,248 B2 | 6/2008 | Chen |
| 7,418,390 B1 * | 8/2008 | Jokipii ........................ 704/270.1 |
| 7,536,402 B2 | 5/2009 | Wang |
| 7,644,374 B2 | 1/2010 | Wong et al. |
| 7,660,740 B2 | 2/2010 | Boone et al. |
| 7,752,034 B2 | 7/2010 | Brockett et al. |
| 7,752,266 B2 | 7/2010 | Grove |
| 7,895,082 B2 | 2/2011 | Veres et al. |
| 7,908,132 B2 | 3/2011 | Brockett et al. |
| 7,941,348 B2 | 5/2011 | Veres et al. |
| 8,050,957 B2 | 11/2011 | Woehler |
| 8,069,419 B2 | 11/2011 | Sanders et al. |
| 8,140,510 B2 | 3/2012 | Wang |
| 8,249,885 B2 | 8/2012 | Berkowitz et al. |
| 8,255,286 B2 | 8/2012 | Veres et al. |
| 8,266,016 B2 | 9/2012 | Boone et al. |
| 8,442,871 B2 | 5/2013 | Veres et al. |
| 8,639,829 B2 | 1/2014 | Grove |
| 8,719,041 B2 | 5/2014 | Veres et al. |
| 8,732,037 B2 | 5/2014 | Boone et al. |
| 2001/0011241 A1 | 8/2001 | Nemzow |
| 2001/0029442 A1 | 10/2001 | Shiotsu et al. |
| 2001/0029455 A1 | 10/2001 | Chin et al. |
| 2001/0032165 A1 | 10/2001 | Friend et al. |
| 2001/0032175 A1 | 10/2001 | Holden et al. |
| 2001/0039531 A1 | 11/2001 | Aoki |
| 2001/0049707 A1 | 12/2001 | Tran |
| 2001/0051943 A1 | 12/2001 | Drucker et al. |
| 2002/0026363 A1 | 2/2002 | Dunaway, Jr. |
| 2002/0029182 A1 | 3/2002 | Nakagawa |
| 2002/0035466 A1 | 3/2002 | Kodama |
| 2002/0055981 A1 | 5/2002 | Spaey et al. |
| 2002/0069049 A1 * | 6/2002 | Turner ............................... 704/8 |
| 2002/0082977 A1 | 6/2002 | Hammond et al. |
| 2002/0087568 A1 | 7/2002 | LeDonne et al. |
| 2002/0099685 A1 | 7/2002 | Takano et al. |
| 2002/0103794 A1 | 8/2002 | Chang |
| 2002/0105532 A1 | 8/2002 | Oblinger |
| 2002/0105550 A1 | 8/2002 | Biebesheimer et al. |
| 2002/0107842 A1 | 8/2002 | Biebesheimer et al. |
| 2002/0107843 A1 | 8/2002 | Biebesheimer et al. |
| 2002/0107852 A1 | 8/2002 | Oblinger |
| 2002/0111967 A1 * | 8/2002 | Nagase ........................... 707/513 |
| 2002/0123959 A1 | 9/2002 | Mozley et al. |
| 2002/0123982 A1 * | 9/2002 | Masuichi ........................... 707/1 |
| 2002/0149614 A1 | 10/2002 | Biebesheimer et al. |
| 2002/0152190 A1 | 10/2002 | Biebesheimer et al. |
| 2002/0154166 A1 | 10/2002 | Sanders et al. |
| 2002/0156688 A1 * | 10/2002 | Horn et al. ......................... 705/26 |
| 2002/0169662 A1 | 11/2002 | Claiborne |
| 2002/0169759 A1 | 11/2002 | Kraft et al. |
| 2002/0174010 A1 | 11/2002 | Rice |
| 2002/0188670 A1 | 12/2002 | Stringham |
| 2002/0193986 A1 | 12/2002 | Schirris |
| 2002/0194166 A1 | 12/2002 | Fowler |
| 2002/0198713 A1 | 12/2002 | Franz et al. |
| 2003/0005159 A1 | 1/2003 | Kumhyr |
| 2003/0011608 A1 | 1/2003 | Wada |
| 2003/0018885 A1 | 1/2003 | Landsman et al. |
| 2003/0033137 A1 | 2/2003 | Holubar et al. |
| 2003/0046059 A1 * | 3/2003 | Litster et al. ......................... 704/8 |
| 2003/0055747 A1 | 3/2003 | Carr et al. |
| 2003/0074462 A1 | 4/2003 | Grove |
| 2003/0078033 A1 | 4/2003 | Sauer et al. |
| 2003/0084051 A1 | 5/2003 | Depura et al. |
| 2003/0088566 A1 * | 5/2003 | Wang ................................. 707/6 |

(56) References Cited

U.S. PATENT DOCUMENTS

| | | |
|---|---|---|
| 2003/0093326 A1 | 5/2003 | Poon et al. |
| 2003/0105682 A1 | 6/2003 | Dicker et al. |
| 2003/0110047 A1 | 6/2003 | Santosuosso et al. |
| 2003/0120560 A1 | 6/2003 | Almeida |
| 2003/0126235 A1 | 7/2003 | Chandrasekar et al. |
| 2003/0131006 A1 | 7/2003 | Monahan et al. |
| 2003/0154134 A1 | 8/2003 | Wang |
| 2003/0208352 A1* | 11/2003 | Lee ............................... 704/2 |
| 2003/0208477 A1 | 11/2003 | Smirniotopoulos et al. |
| 2003/0229545 A1 | 12/2003 | Veres et al. |
| 2003/0229554 A1 | 12/2003 | Veres et al. |
| 2004/0001106 A1* | 1/2004 | Deutscher et al. ............ 345/838 |
| 2004/0034629 A1 | 2/2004 | Genser |
| 2004/0068488 A1 | 4/2004 | Dettinger et al. |
| 2004/0068489 A1 | 4/2004 | Dettinger et al. |
| 2004/0073507 A1 | 4/2004 | Scott et al. |
| 2004/0083213 A1 | 4/2004 | Wu et al. |
| 2004/0215612 A1 | 10/2004 | Brody |
| 2005/0004911 A1 | 1/2005 | Goldberg et al. |
| 2005/0005266 A1 | 1/2005 | Datig |
| 2005/0050477 A1 | 3/2005 | Robertson et al. |
| 2005/0222984 A1 | 10/2005 | Radestock et al. |
| 2005/0256852 A1 | 11/2005 | McNall et al. |
| 2006/0020576 A1 | 1/2006 | Karube |
| 2006/0074792 A1 | 4/2006 | Wagoner et al. |
| 2006/0074984 A1 | 4/2006 | Milener |
| 2006/0100462 A1 | 5/2006 | Vanoppen et al. |
| 2006/0106783 A1 | 5/2006 | Saffer et al. |
| 2006/0167864 A1 | 7/2006 | Bailey |
| 2006/0200353 A1 | 9/2006 | Bennett |
| 2006/0200462 A1 | 9/2006 | Kadayam et al. |
| 2007/0081197 A1 | 4/2007 | Omoigui |
| 2007/0088722 A1 | 4/2007 | Wang |
| 2007/0112643 A1 | 5/2007 | Veres et al. |
| 2007/0156677 A1 | 7/2007 | Szabo |
| 2007/0185850 A1 | 8/2007 | Walters et al. |
| 2008/0152095 A1 | 6/2008 | Kleindienst et al. |
| 2009/0187565 A1 | 7/2009 | Wang |
| 2009/0228481 A1 | 9/2009 | Neale et al. |
| 2010/0131510 A1 | 5/2010 | Boone et al. |
| 2010/0228536 A1 | 9/2010 | Grove |
| 2011/0231530 A1 | 9/2011 | Veres et al. |
| 2012/0233259 A1 | 9/2012 | Work |
| 2012/0246233 A1 | 9/2012 | Veres et al. |
| 2012/0284304 A1 | 11/2012 | Boone et al. |
| 2014/0142919 A1 | 5/2014 | Grove |
| 2014/0297459 A1 | 10/2014 | Boone et al. |
| 2014/0297461 A1 | 10/2014 | Boone et al. |
| 2014/0297462 A1 | 10/2014 | Boone et al. |
| 2014/0297463 A1 | 10/2014 | Boone et al. |
| 2014/0297464 A1 | 10/2014 | Boone et al. |
| 2014/0297475 A1 | 10/2014 | Boone et al. |
| 2014/0297482 A1 | 10/2014 | Boone et al. |
| 2014/0297483 A1 | 10/2014 | Boone et al. |
| 2014/0297484 A1 | 10/2014 | Boone et al. |
| 2014/0304120 A1 | 10/2014 | Boone et al. |
| 2014/0324594 A1 | 10/2014 | Veres et al. |
| 2015/0127502 A1 | 5/2015 | Knepfle et al. |

FOREIGN PATENT DOCUMENTS

| | | |
|---|---|---|
| JP | 2000-322490 | 11/2000 |
| JP | 02207898 | 7/2002 |
| JP | 04-094643 | 3/2004 |
| NL | 9300266 | 2/1993 |
| WO | WO-9215174 | 9/1992 |
| WO | WO-9517711 | 6/1995 |
| WO | WO-9634356 | 10/1996 |
| WO | WO-9737315 | 10/1997 |
| WO | WO-9963461 | 12/1999 |
| WO | WO-0058862 | 10/2000 |
| WO | WO-0078557 A1 | 12/2000 |
| WO | WO-0182107 A1 | 11/2001 |
| WO | WO-0182115 | 11/2001 |
| WO | WO-03/038560 A2 | 5/2003 |
| WO | WO-03038560 A3 | 5/2003 |

OTHER PUBLICATIONS

"Andale Lister: Online or Offline, http://www.andale.com/corp/products/qs_sell_details_onofflinejsp.", (Dec. 18, 2002),1-2.

"Andale Lister: Design Center, http://www.andale.com/corp/products/qs_sell_details_designcenter.jsp.", (Dec. 18, 2002),1-2.

"Andale Lister: Inventory Dashboard, http://www.andale.com/corp/products/qs_sell_details_invdashboard.jsp.", (Dec. 18, 2002),1-2.

"Andale Lister: Launch Scheduler, http://www.andale.com.corp.products/qs_sell_details_launchsched.jsp.", (Dec. 18, 2002),1-4.

"Andale Overview, http://www.andale.com/corp/products/qs_overview.jsp.", (Dec. 18, 2002),1-4.

"Anonymous Delivery of Goods in Electronic Commerce", *IBM Technical Disclosure Bulletin*, vol. 39, No. 3., (Mar. 1996),363-366.

"International Search Report", PCT/US03/17915, (Nov. 26, 2003).

"International Search Report", PCT/US99/29312, (Dec. 8, 1999).

"International Search Report", PCT/US00/32088, (Nov. 20, 2000).

"International Search Report", PCT/US01/02584, (Jan. 26, 2001).

"International Search Report", PCT/US02/04692, (Feb. 11, 2002).

"International Search Report", PCT/US99/18510, (Aug. 12, 1999).

"International Search Report", PCT/US01/12398, (Apr. 16, 2001).

"International Search Report", PCT/US01/04811, (Feb. 14, 2001).

"International Search Report", PCT/US00/17136, (Jun. 21, 2000).

"International Search Report", PCT/US01/23854, (Jul. 24, 2001).

"Mediapraise", *Mediappraise receives national award for web-based technology that enables companies to solve thorn HR problem.* Business Editors., (Dec. 14, 1998).

"Onsale Joins Fray as Online Shopping Picks up Speed: Internet Booms", *Computer Reseller News*, (www.dialogweb.com)., (Jun. 5, 1995),p. 73.

"Onsale: Onsale Brings Thrill of Auctions and Bargain Hunting Online; Unique Internet Retail Service Debuts With Week-long Charity Auction for the Computer Museum in Boston, Dialog Web. 0489267 BW0022.", (May 24, 1995),p. 3.

"Personal Optimized Decision/Transaction Program", *IBM Technical Disclosure Bulletin*, vol. 38, No. 1., (Jan. 1995),83-84.

"Subasta.com Enters Into Strategic Partnership With From2.com", *Business Wire*, 06242815 Dialog File 20: see p. 1., (Jul. 16, 1999).

"Subasta.com The Premier Online Auction Board for Latin America, Spain, and the Hispanic Sector of the U.S., Has Attracted Over 60,000 Viewers in Less Than Two Months!", *Business Wire*, 06240372 Dialog File 20: see all pages., (Jul. 16, 1999).

"United Technologies: UTC's Carrier Corp. Teams With FreeMarkets to Create Largest Asian-based B2B Online Auction Market to Date; UTC Division Identifies Average Annual Savings of More Than 16 Percent on Electric Motors Through FreeMarkets B2B Marketplace", *M2 Presswire*, 10190474 Dialog File 20; see all pages., (Mar. 22, 2000).

"Yahoo! Auctions Celebrates One-Year Anniversary; As Online Aution Usage Continues to Grow, Yahoo! is Quickly Becoming the World Marketplace of the New Millennium.", *Business Wire*, 07211889 Dialog File 20: see all pages., (Sep. 14, 1999).

Akin, D , "Web Retailing Gains Market Muscle As Concerns Fade: Record Season: Increasing Number of Sites Catering for Canadian Dollar", *Financial Post*, 03856053 Dialog File 20: see all pages., (Dec. 26, 1998),7.

Clemons, E , "Evaluating the Prospects for Alternative Electronic Securities Markests", *International Conference on Information Systems*, vol. 12., (1991),53-61.

Graham, I , "The Emergence of Linked Fish Markest in Europe", *Focus Theme*, No Date Given.

Hess, C M , et al., "Computerized Loan Organization System: An Industry Case Study of the Electronic Markets Hypothesis", *MIS Quarterly*, vol. 18. No. 3., (Sep. 1994),251-274.

Klein, S , "Introduction to Electronic Auctions", *Focus Theme*, No Date Given.

Lee, H G , "AUCNET: Electronic Intermediary for Used-car Transactions", *Focus Theme*, No Date Given.

(56) References Cited

OTHER PUBLICATIONS

Lee, Ho G., "Electronic Brokerage and Electronic Auction: The Impact of IT on Market Structures", *Proceedings of the 29th HICSS*, vol. IV., (1996),397-406.

Malone, T W , et al., "Electronic Markets and Electronic Hierarchies", *Communications—of the ACM*, vol. 30 No. 6., (Jun. 1987),484-497.

Mardesich, J , "Onsale Takes Auction Gavel Electronic", *Computer Reseller News*, p. 2 continued on p. 32., (Jul. 8, 1996).

Massimb, M N , et al., "Electronic Trading, Market Structure and Liquidity", *Financial Analyst Journal*, vol. 50, No. 1., (Feb. 1994),39-50.

Meade, Jim , "Visual 360: a Performance Appraisal System That's Fun", *HR Magazine*, (Dialog file)., (Jul. 1999).

Merrill, Kevin , "GE Capital to Extend Integrator Buying Spree", *Computer Resell News*, http:///www.crn.com, (Jul. 8, 1996),p. 31-32

Neo, B S , "The Implementation of an Electronic Market for Pig Trading in Singapore", *Journal of Strataegic Information Systems*, vol. 1, (Dec. 1992),278-288.

Post, D L , et al., "Application of Auctions as a Pricing Mechanism fo the Interchange of Electric Power", *IEEE Transactions on Power Systems*, vol. 10, No. 3., (Aug. 1995),7.

Priest, Chris , et al., "Adaptive Agents in a Persistent Shout Double Auction", *Proceedings of the First International Conference on Information and Computation Economies*, Charleston, US, (Oct. 1998),25-281.

Reck, Martin , "Formally Specifying and Automated Trade Execution System", *Journal of Systems and Software*, vol. 21., (1993),245-252.

Reck, Martin , "Trading-Process Characteristics of Electronic Auctions", *Focus Theme*, No Date Given.

Resnick, Paul , et al., "Reputation Systems", *Association for Computing Machinery, Communications of The ACM*, vol. 43, No. 12, (Dialog file)., 45-48.

Rockoff, T E , et al., "Design of an Internet-based system for Remote Dutch Auctions", *Internet Research—Electronic Networking Applications and Policy*, vol. 5, No. 4., (Jan. 1, 1995),10-16.

Schmid, B F , "The Development of Electronic Commerce", *Newsletter of the Competence Center Electronic Markets*, No. 9/10., (Oct. 1993).

Siegmann, Ken , "Nowhere to go bu up", *PC Week*, vol. 12, No. 42 (www.dialogweb.com)., (Oct. 23, 1995),1-3.

Tjostheim, I , "A Cast Study of an On-line Auction for the World Wide Web", *Norwegian Computing Center*, No Date Given, wwwlnr.no. gem.elcom.publikasjoner.enter98e.html.

Turban, E , "Auctions and Bidding on the Internet an Assessment", *Focus Theme*, No Date Given.

Van Heck, E , et al., "Experiences with Electronic Auctions in the Dutch Flower Industry", *Focus Theme*, No Date Given.

Warbelow, A , et al., "Aucnet: TV Auction Network System", *Havard Business School Case/Study*, HBVR #9-190-001, USA, (Jul. 1989),1-15.

Zwass, Vladimir , "Electronic Commerce: Structures and Issues", *International Journal of Electronic Commerce*, Fall, vol. 1, No. 1, (www.cba.bgsu.edu)., (1996),3-23.

Business Wire, "Yahoo! Launches Three New European Auctions Services;Yahoo! Italy, Yahoo! Spain and Yahoo! Sweden Unveil New Local Auctions", *Business Wire*, Obtained from Proquest, Document No. 45061209, (Sep. 23, 1999), 3 pages.

Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", *Wall Street Journal Europe*, Obtained from Proquest, Document No. 46338867, (Nov. 15, 1999), 5 pages.

Pollick, M., "Sold! on eBay: As antique and collectible dealers see their sales increase through online auctions such as eBay, more of them are deciding that the internet is not something to be afraid of", *Sarasota Herald Tribune*, Obtained from Proquest, Document No. 45499060, (Oct. 11, 1999), 8 pages.

PR Newswire Europe Ltd., "Mitsubishi Venture, Wells Fargo Partner to Offer Multi-Currency E-Commerce Storefront", *PR Newswire*, Obtained from Proquest, Document No. 39345965, (Mar. 1, 1999), 3 pages.

Schneider, G. M., et al., "An Introduction to Programming and Problem Solving with Pascal", *An Introduction to Programming and Problem Solving with Pascal, Second Edition*, John Wiley & Sons, Inc., New York, (1982), 3 Pages.

Wilson, T., "Act Globally, Think Locally", *InternetWeek*, Issue 789, Obtained from Proquest, Document No. 46352181,(Nov. 15, 1999), 4 p.

*eBay:Internet Archive Wayback Machine*,www.archive.org;www.ebay.com: 07 , 12, (Oct. 1999),8 pgs.

www.AuctionWatch.com, recovered from www.archive.org on Jun. 8, 2007, (Aug. 15, 2000),30 pages.

*Microsoft Computer Dictionary*, 5th edition, 178.

U.S. Appl. No. 09/602,110 Advisory Action mailed May 26, 2006, 3 pgs.

U.S. Appl. No. 09/602,110 Final Office Action mailed Mar. 8, 2006, 13 pgs.

U.S. Appl. No. 09/602,110 Final Office Action mailed Sep. 2, 2004, 13 pgs.

U.S. Appl. No. 09/602,110 Final Office Action mailed Nov. 21, 2005, 13 pgs.

U.S. Appl. No. 09/602,110 Non Final Office Action mailed Jan. 21, 2004, 25 pgs.

U.S. Appl. No. 09/602,110 Non Final Office Action mailed Apr. 5, 2005, 13 pgs.

U.S. Appl. No. 09/602,110 Response filed Jan. 3, 2005 to Final Office Action mailed Sep. 2, 2004, 16 pgs.

U.S. Appl. No. 09/602,110 Response filed Jan. 23, 2006 to Final Office Action mailed Nov. 21, 2005, 15 pgs.

U.S. Appl. No. 09/602,110 Response filed May 8, 2006 to Final Office Action mailed Mar. 8, 2006, 17 pgs.

U.S. Appl. No. 09/602,110 Response filed Aug. 4, 2005 to Non Final Office Action mailed Apr. 5, 2005, 19 pgs.

U.S. Appl. No. 09/905,525 Final Office Action mailed Jan. 10, 2008, FOAR,18 pgs.

U.S. Appl. No. 09/905,525, Response filed Sep. 25, 2007 to Non-Final Office Action mailed Jun. 25, 2007, 17 pgs.

U.S. Appl. No. 09/905,525 Final Office Action mailed Jun. 29, 2006, 20 pgs.

U.S. Appl. No. 09/905,525 Non Final Office Action mailed Jun. 25, 2007, 16 pgs.

U.S. Appl. No. 09/905,525 Non Final Office Action mailed Dec. 12, 2005, 14 pgs.

U.S. Appl. No. 09/905,525 Non Final Office Action mailed Dec. 14, 2004, 33 pgs.

U.S. Appl. No. 09/905,525 Non Final Office Action mailed Dec. 18, 2006, 15 pgs.

U.S. Appl. No. 09/905,525 Response filed Mar. 19, 2007 to Non Final Office Action mailed Dec. 18, 2006, 9 pgs.

U.S. Appl. No. 09/905,525 Response filed Apr. 12, 2006 to Non Final Office Action mailed Dec. 12, 2005, 8 pgs.

U.S. Appl. No. 09/905,525 Response filed Apr. 13, 2005 to Non Final Office Action mailed Dec. 14, 2004, 17 pgs.

U.S. Appl. No. 09/905,525 Response filed Sep. 22, 2006 to Final Office Action mailed Jun. 29, 2006, 19 pgs.

U.S. Appl. No. 09/976,301 Advisory Action mailed Sep. 30, 2005, 3 pgs.

U.S. Appl. No. 09/976,301 Advisory Action mailed Nov. 30, 2006, 3 pgs.

U.S. Appl. No. 09/976,301 Final Office Action mailed Jul. 13, 2005, 11 pgs.

U.S. Appl. No. 09/976,301 Final Office Action mailed Aug. 25, 2006, 14 pgs.

U.S. Appl. No. 09/976,301 Non Final Office Action mailed Mar. 9, 2007, 13 pgs.

U.S. Appl. No. 09/976,301 Non Final Office Action mailed Nov. 24, 2004, 31 pgs.

U.S. Appl. No. 09/976,301 Non Final Office Action mailed Dec. 16, 2005, 17 pgs.

(56) References Cited

OTHER PUBLICATIONS

U.S. Appl. No. 09/976,301 Response filed Apr. 6, 2005 to Non Final Office Action mailed Nov. 24, 2004, 15 pgs.
U.S. Appl. No. 09/976,301 Response filed May 16, 2006 to Non Final Office Action mailed Dec. 16, 2005, 24 pgs.
U.S. Appl. No. 09/976,301 Response filed Jun. 7, 2007 to Non Final Office Action mailed Mar. 9, 2007, 7 pgs.
U.S. Appl. No. 09/976,301 Response filed Sep. 13, 2005 to Final Office Action mailed Jul. 13, 2005, 13 pgs.
U.S. Appl. No. 09/976,301 Response filed Oct. 13, 2005 to Advisory Action mailed Jul. 13, 2005, 14 pgs.
U.S. Appl. No. 09/976,301 Response filed Oct. 24, 2006 to Final Office Action mailed Aug. 25, 2006, 6 pgs.
U.S. Appl. No. 09/976,301 Response filed Dec. 19, 2006 to Advisory Action mailed Nov. 30, 2006, 16 pgs.
U.S. Appl. No. 10/252,126 Final Office Action mailed Feb. 26, 2008, FOAR,18 pgs.
U.S. Appl. No. 10/252,126, Response filed Dec. 20, 2007 to Non-Final Office Action mailed Aug. 20, 2007, 8 pgs.
U.S. Appl. No. 10/252,126 Final Office Action mailed Jun. 27, 2006, 13 pgs.
U.S. Appl. No. 10/252,126 Non Final Office Action mailed Jan. 30, 2007, 11 pgs.
U.S. Appl. No. 10/252,126 Non Final Office Action mailed Feb. 3, 2006, 30 pgs.
U.S. Appl. No. 10/252,126 Non Final Office Action mailed Aug. 20, 2007, 10 pgs.
U.S. Appl. No. 10/252,126 Response filed May 3, 2006 to Non Final Office Action mailed Feb. 3, 2006, 7 pgs.
U.S. Appl. No. 10/252,126 Response filed Jun. 25, 2007 to Non Final Office Action mailed Jan. 30, 2007, 11 pgs.
U.S. Appl. No. 10/606,410, Non-Final Office Action mailed Jul. 31, 2007, 18 pgs.
U.S. Appl. No. 10/606,410, Non-Final Office Action mailed Nov. 3, 2006, 17 pgs.
U.S. Appl. No. 10/606,410, Response May 3, 2007 to Non-Final Office Action mailed Nov. 3, 2006, 13 pgs.
U.S. Appl. No. 10/606,410, Response filed Nov. 30, 2007 to Non-Final Office Action mailed Jul. 31, 2007, 14 pgs.
U.S. Appl. No. 09/976,301, Response filed Dec. 13, 2007 to Non-Final Office Action mailed Sep. 13, 2007, 17 pgs.
"Blackthorne Products Page", http://web.archive.org/web/19990508065201/www.blackthornesw.com/Bthome/products, (1999).
"Chinese office action issued Mar. 23, 2007 in Application No. 02824589", 16 pgs.
"Ebay: Internet Archive Wayback Machine/www.archive.org;", www.ebay.com; 02,04, 07, 12, 13, Oct. 1999, 23 pgs., (1999).
"Frequently Asked Questions about Mister Lister", http://pages.ebay.co.uk/help/sellerguide/mr-lister-faq.html, (Copyright 1995-2005).
"Hello direct store joins eBay network of merchants", *PR Newswire*, New York, NY, (May 23, 2002), 1.
"New eBay-like auction software released", *Business Wire*, Business Editors/High-Tech Writers; Business Wire; New York,(Mar. 17, 1999),2 pp.
"Subasta.com,the Premier Online Auction Board for Latin America, Spain, and the Hispanic Sector of the U.S., has Attracted Over 60,000 Viewers in Less than Two Months!", *Business Wire*, Proquest # 43203028,(Jul. 16, 1999),3pgs.
"Yahoo Homepage", *Internet Archive Wayback Machine*, http://web.archive.org/web/19991003015603/http://www.yahoo.com/index.html,(Oct. 3, 1999), 1 p.
"Yahoo!—Regional:Countries:Afghanistan", http://web.archive.org/web/20060921181441/http://dir.yahoo.com/Regional/countries/afghanistan, (Jun. 16, 1997).
"Yahoo!—Regional:Countries:Sweden", http://web.archive.org/web/19970616194441/www.yahoo.com/Regional/Countries/Sweden/, (Jun. 16, 1997).

Akin, David , "Web retailing gains market muscle as concerns fade: Record season: Increasing number of sites catering for Canadian dollars", *Financial Post*, p04, XP002905105,(Dec. 26, 1998),3 pages.
Alice, Michele , "eBay's 'Mister Lister' Auction Management Software", *Auctionbytes-Update*, No. 22, (Sep. 24, 2000).
AuctionWatch.com, et al., *AuctionWatch.com's Official Guide to Online Buying and Selling: Professional Tips, Tactics and Techniques at Your Fingertips.*, Prima Publishing, Roseville, CA. ISBN 0-7615-2999-3,(2000),307 pgs.
AuctionWatch.com, et al., "AuctionWatch CD", *AuctionWatch.com's Official Guide to Online Buying and Selling: Professional Tips, Tactics and Techniques at Your Fingertips.*, Prima Publishing, Roseville, CA.,(2000).
Business Wire, "Bay Builder Releases Major Innovation for Online Wireless Auctions.", Recovered via Dialog Database on Feb. 15, 2008, (Mar. 10, 2000).
Collete, Stacy "Thin Clients Pull in Car Customers: Auto Auction company eyes move to Web.(Industry Trend or Event)", *Computerworld recovered via dialog database* on Feb. 15, 2008, (Apr. 5, 1999),p. 41(1).
Grubbs, L. , "Top 5 auction utilities", PC World.com, San Francisco, CA, (Dec.4, 2000), 1.
Hansell, Saul , "Meg Whitman and eBay, Net Survivors", *New York Times*, (May 5, 2002).
Hutchinson, Art , "E-Commerce : Building a Model", *Art. Communications Week recovered via Dialog Database* on Feb. 15, 2008., (Mar. 17, 1997),p. 57.
M2 Presswire, "HP completes online strategy with launch of e-commerce site", Proquest#43225990,(Jun. 29, 1999),3.
McClenahen, John , "Net Gains" *Industry Week*,Proquest # 41808971, 8 pgs., (May 17, 1999).
Merrill, Kevin , "GE Capital to extend integrator buying spree. (GE Capital Technology", *Computer Reseller News*, n691, (Jul. 8, 1996),2(1).
Pressler, Margaret, "Sells on eBay; Housewife finds herself head of multinational software firm", *Washington Post*, Proquest # 44484325, (Sep. 5, 1999),3 pgs.
Tapscott, D. , "eBay endagners traditional papers auctioneer can pack far more punch in your sales pitch", *National Post*, Proquest# 54945579,(Oct. 9, 1999),3 pgs.
Wikipedia, "Thin Client", [Online]. Retrieved from the Internet: <URL:http://en./wikipedia.org/wiki/Thin_client>, (Feb. 15, 2008),13 pgs.
Wilson, D. , "Going . . . Going . . . Gone!Bargain-hunters and collectors can scour auctions from home via the internet", *The Gazette*, Proquest #4116732,(Apr. 27, 1999),4 pgs.
www.thinclient.net., Accessed via www.archive.org on Feb. 26, 2008, (Jan. 22, 2004), 24 pgs.
U.S. Appl. No. 09/602,110, Amendment filed Apr. 28, 2008, 17 pgs.
U.S. Appl. No. 09/602,110, Non-Final Office Action mailed Jul. 21, 2008, 12 pgs.
U.S. Appl. No. 09/602,110, Response filed May 21, 2004 to Non-Final Office Action mailed Jan. 21, 2004, 18 pgs.
U.S. Appl. No. 09/905,525, Non-Final Office Action mailed Aug. 22, 2008, 18 pgs.
U.S. Appl. No. 09/905,525, Response filed Mar. 27, 2008 to Final Office Action mailed Jan. 10, 2008, 17 pgs.
U.S. Appl. No. 09/905,525, Response filed Jun. 10, 2008 to Final Office Action mailed Jan. 10, 2008, 20 pgs.
U.S. Appl. No. 09/905,525, Advisory Action mailed May 2, 2008, 5 pgs.
U.S. Appl. No. 09/976,301, Final Office Action mailed Mar. 17, 2008, 14 pgs.
U.S. Appl. No. 09/976,301, Response filed May 19, 2008 to Final Office Action mailed Mar. 17, 2008, 19 pgs.
U.S. Appl. No. 09/976,301 Amendments filed with RCE, 24 pgs.
U.S. Appl. No. 10/252,126, Final Office Action mailed Sep. 4, 2008, 13 pgs.
U.S. Appl. No. 10/252,128, Non-Final Office Action mailed Mar. 21, 2008, 12 pgs.
U.S. Appl. No. 10/252,128, Response filed Jul. 21, 2008 to Non-Final Office Action mailed Mar. 21, 2008, 11 pgs.

(56) References Cited

OTHER PUBLICATIONS

U.S. Appl. No. 10/252,126, Response filed Dec. 29, 20055 to Restriction Requirement mailed Oct. 31, 2005, 5 pgs.
U.S. Appl. No. 10/252,126, Response filed Jul. 28, 2008 to Final Office Action mailed Feb. 26, 2008, 7 pgs.
U.S. Appl. No. 10/252,126, Retriction Requirement mailed Oct. 31, 2005, 7 pgs.
U.S. Appl. No. 10/606,410, Response filed Aug. 13, 2008 to Final Office Action mailed Mar. 13, 2008, 11 pgs.
U.S. Appl. No. 10/606,410, Non-Final office Action Mailed Oct. 8, 2008, 14 pgs.
U.S. Appl. No. 10/606,410 Final Office Action mailed Mar. 13, 2008, 15 Pgs.
"DHL and UPS offer country-specific services", *Transportation and distribution*, vol. 38, Iss. 12, (Dec. 1997), 18.
"Google looking at more Country Specific Domains", *Europmedia*, (Jan. 17, 2002).
"Photodisc localizes Internet presence to better serve global markets;Adds country-specific content and languages to its Award-wining Websites", *Business Wire*, (May 27, 1998), 3 pgs.
BIDNBUY, "Going, going, virtually gone . . . ", *Business and Finance Dialog File* 20#06012646, (Jun. 17, 1999), 3 pgs.
Tak, Y., et al., "The SIFT Information Dissemination System", ACM Transactions on Database Systems. vol. 24, Issue 4. *ACM Press*, (Dec. 1999), 529-565.
U.S. Appl. No. 10/606,410 Response filed Jan. 6, 2009 to Non-Final Office Action mailed 10-08-0, 14 pgs.
U.S. Appl. No. 11/558,291 Non-Final Office Action mailed Jul. 28, 2008, 14pgs.
Reck, M., "Formally Specifying an Automated Trade Execution System", *The Journal of Systems and Software*, 1993, Elsevier Science Publishing, USA, (1993), 245-252.
U.S. Appl. No. 09/602,110, Appeal Brief filed Dec. 15, 2006, 34 pgs.
U.S. Appl. No. 09/602,110, Appeal Decision mailed Feb. 28, 2008, 13 pgs.
U.S. Appl. No. 09/602,110, Decision on Pre-Appeal Brief mailed Aug. 15, 2006, 2 pgs.
U.S. Appl. No. 09/602,110, Final Office Action mailed Nov. 17, 2008, 12 pgs.
U.S. Appl. No. 09/602,110, Non-Final Office Action mailed Mar. 18, 2009, 19 pgs.
U.S. Appl. No. 09/602,110, Pre-Appeal Brief filed Jun. 27, 2006, 4 pgs.
U.S. Appl. No. 09/602,110, Reply Brief mailed May 15, 2007, 2 pgs.
U.S. Appl. No. 09/602,110, Response filed Feb. 17, 2009 to Final Office Action mailed Nov. 17, 2008, 21 pgs.
U.S. Appl. No. 09/602,110, Response filed Oct. 21, 2008 to Non-Final Office Action mailed Jul. 21, 2008, 19 pgs.
U.S. Appl. No. 09/602,110, Response filed Jul. 20, 2009 to Non Final Office Action mailed Mar. 18, 2009, 21 pgs.
U.S. Appl. No. 09/602,110, Response to Examiner's Answer filed May 7, 2007, 11 pgs.
U.S. Appl. No. 09/905,525, Non-Final Office Action mailed Mar. 5, 2009, 25 pgs.
U.S. Appl. No. 09/905,525, Notice of Allowance mailed Sep. 18, 2009, 37 pgs.
U.S. Appl. No. 09/905,525, Response filed Jun. 5, 2009 to Non Final Office Action mailed Mar. 5, 2009, 19 pgs.
U.S. Appl. No. 09/905,525, Response filed Nov. 24, 2008 to Non-Final Office Action mailed Aug. 22, 2008, 17 pgs.
U.S. Appl. No. 09/976,301, Advisory Action mailed Jun. 9, 2008, 5 pgs.
U.S. Appl. No. 09/976,301, Decision on Pre-Appeal Brief mailed Jul. 29, 2008, 2 pgs.
U.S. Appl. No. 09/976,301, Final Office Action mailed Jun. 4, 2009, 15 pgs.
U.S. Appl. No. 09/976,301, Non Final Office Action mailed Sep. 13, 2007, 12 pgs.
U.S. Appl. No. 09/976,301, Non-Final Office Action mailed Dec. 23, 2008, 23 pgs.
U.S. Appl. No. 09/976,301, Pre-Appeal Brief Request filed Jun. 16, 2008, 5 pgs.
U.S. Appl. No. 09/976,301, Response filed Mar. 23, 2009 to Non Final Office Action mailed Dec. 23, 2008, 19 pgs.
U.S. Appl. No. 09/976,301, Response filed Aug. 4, 2009 to Final Office Action mailed Jun. 4, 2009, 15 pgs.
U.S. Appl. No. 09/976.301, Response filed Sep. 4, 2009 to Final Office Action mailed Jun. 4, 2009, 20 pgs.
U.S. Appl. No. 10/252,126, Appeal Brief filed Feb. 4, 2009, 22 pgs.
U.S. Appl. No. 10/252,126, Response filed Oct. 27, 2006 to Final Office Action mailed Jun. 27, 2006, 8 pgs.
U.S. Appl. No. 10/252,128, Final Office Action mailed Apr. 3, 2009, 27 pgs.
U.S. Appl. No. 10/252,128, Response filed Aug. 3, 2009 to Final Office Action mailed Apr. 3, 2009, 4 pgs.
U.S. Appl. No. 10/252,128, Response filed Dec. 23, 2008 to Restriction Requirement mailed Nov. 24, 2008, 10 pgs.
U.S. Appl. No. 10/252,128, Restriction Requirement mailed Nov. 24, 2008, 8 pgs.
U.S. Appl. No. 10/606,410, Response filed Jan. 6, 2009 to Non-Final Office Action mailed Oct. 8, 2008, 14 pgs.
U.S. Appl. No. 10/606,410, Final Office Action mailed May 15, 2009, 16 pgs.
U.S. Appl. No. 10/606,410, Final Office Action mailed Sep. 2, 2009, 13 pgs.
U.S. Appl. No. 10/606,410, Response filed Jul. 15, 2009 to Final Office Action mailed May 15, 2009, 14 pgs.
U.S. Appl. No. 10/606,410, Response filed Nov. 2, 2009 to Final Office Action mailed Sep. 2, 2009, 10 pgs.
U.S. Appl. No. 11/558,291, Non-Final Office Action mailed Jul. 28, 2008, 14 pgs.
U.S. Appl. No. 09/602,110, Final Office Action mailed Nov. 25, 2009, 3 pgs.
U.S. Appl. No. 09/976,301, Notice of Allowance mailed Dec. 2, 2009, 15 pgs.
Lassila, Ora, "Web metadata; A Matter of Semantics", *IEEE Internet Computing*, v2i4pg30 Proquest #1424143061, (1998), 15 pgs.
Reck, M., "Formally Specifying an Automated Trade Execution Systems", *The Journal of Systems and Software*, 1993, Elsevier Science Publishing, USA, (1993), 245-252.
U.S. Appl. No. 09/976,301, Advisory Action mailed Aug. 13, 2009, 3 pgs.
U.S. Appl. No. 09/563,069, Advisory Action mailed Oct. 24, 2002, 3 pgs.
U.S. Appl. No. 09/563,069, Examiner Interview Summary mailed Aug. 12, 2002, 2 pgs.
U.S. Appl. No. 09/563,069, Final Office Action mailed Jun. 4, 2002, 11 pgs.
U.S. Appl. No. 09/563,069, Notice of Allowance mailed Jan. 28, 2003, 7 pgs.
U.S. Appl. No. 09/563,069, Response filed Jan. 16, 2002 to Non Final Office Action mailed Nov. 21, 2001, 23 pgs.
U.S. Appl. No. 09/563,069, Response filed Oct. 4, 2002 to Final Office Action mailed Jun. 4, 2002, 15 pgs.
U.S. Appl. No. 09/602,110, Response filed Jan. 25, 2010 to Final Office Action mailed Nov. 25, 2009, 22 pgs.
U.S. Appl. No. 09/976,301, Examiner Interview Summary mailed Sep. 9, 2009, 4 pgs.
U.S. Appl. No. 10/252,128, Appeal Brief filed Dec. 15, 2009, 23 pgs.
U.S. Appl. No. 10/319,034, 312 Amendment filed Jun. 25, 2004, 3 pgs.
U.S. Appl. No. 10/319,034, Notice of Allowance mailed Apr. 6, 2004, 7 pgs.
U.S. Appl. No. 10/600,861, Final Office Action mailed Jan. 12, 2006, 6 pgs.
U.S. Appl. No. 10/600,861, Non Final Office Action mailed May 17, 2005, 6 pgs.
U.S. Appl. No. 10/600,861, Non Final Office Action mailed Aug. 16, 2004, 6 pgs.
U.S. Appl. No. 10/600,861, Notice of Allowance mailed Jun. 29, 2006, 4 pgs.
U.S. Appl. No. 10/600,861, Response filed Jun. 12, 2006 to Final Office Action mailed Jan. 12, 2006, 8 pgs.

(56) References Cited

OTHER PUBLICATIONS

U.S. Appl. No. 10/600,861, Response filed Aug. 17, 2005 to Non Final Office Action mailed May 17, 2005, 8 pgs.
U.S. Appl. No. 10/600,861, Response filed Dec. 16, 2004 to Non Final Office Action mailed Aug. 16, 2004, 8 pgs.
U.S. Appl. No. 10/606,410, Non-Final Office Action mailed Jan. 25, 2010, 8 pgs.
U.S. Appl. No. 11/558,291, Notice of Allowance mailed Jan. 6, 2009, 12 pgs.
U.S. Appl. No. 11/558,291, Response filed Oct. 29, 2008 to Non Final Office Action mailed Jul. 28, 2008, 9 pgs.
"International Application Serial No. PCT/US01/13253, International Search Report mailed Jul. 31, 2001", 1 pg.
U.S. Appl. No. 10/606,410, Response filed Apr. 26, 2010 to Non Final Office Action mailed Jan. 25, 2001, 12 pgs.
U.S. Appl. No. 11/647,728, Non-Final Office Action mailed Mar. 8, 2010, 18 pgs.
U.S. Appl. No. 11/647,728, Response filed Jun. 8, 2010 to Non Final Office Action mailed Mar. 8, 2010, 13 pgs.
"Auctionwatch", [Online]. Retrieved from the Internet: <URL: http://web.archive.org/web/20000830150100/http://www.auctionwatch.com>, (Aug. 15, 2008), 46 pgs.
U.S. Appl. No. 09/602,110, Advisory Action mailed Feb. 22, 2010, 3 pgs.
U.S. Appl. No. 09/602,110, Appeal Brief filed Apr. 26, 2010, 37 pgs.
U.S. Appl. No. 09/602,110, Examiner's Answer to Appeal Brief mailed Jun. 11, 2010, 20 pgs.
U.S. Appl. No. 09/602,110, Reply Brief filed Aug. 11, 2010, 6 pgs.
U.S. Appl. No. 10/252,126, Examiner's Answer to Appeal Brief mailed Apr. 29, 2009, 12 pgs.
U.S. Appl. No. 10/252,128, Examiner's Answer to Appeal Brief mailed Mar. 31, 2010, 11 pgs.
U.S. Appl. No. 10/606,410, Final Office Action mailed Jul. 15, 2010, 12 pgs.
U.S. Appl. No. 10/606,410, Advisory Action mailed Sep. 30, 2010, Advisory Action.
U.S. Appl. No. 10/606,410, Response filed Sep. 14, 2010 to Final Office Action mailed Jul. 15, 2010, 15 pgs.
U.S. Appl. No. 11/647,728, Examiner Interview Summary Received Aug. 11, 2010, 3 pgs.
U.S. Appl. No. 11/647,728, Final Office Action mailed Jul. 13, 2010, 17 pgs.
U.S. Appl. No. 11/647,728, Notice of Allowance mailed Oct. 19, 2010, 11 pgs.
U.S. Appl. No. 11/647,728, Response filed Sep. 22, 2010 to Final Office Action mailed Jul. 13, 2010, 6 pgs.
U.S. Appl. No. 09/976,301, 312 Amendment filed Jan. 10, 2010, 4 pgs.
U.S. Appl. No. 09/976,301, PTO Response to 312 Amendment mailed Feb. 3, 2010, 2 pgs.
U.S. Appl. No. 10/252,126, Notice of Allowance mailed Dec. 30, 2010, 13 pgs.
U.S. Appl. No. 10/252,128, Decision on Pre-Appeal Brief Request mailed Oct. 15, 2009, 2 pgs.
U.S. Appl. No. 10/606,410, Appeal Brief filed Dec. 14, 2010, 23 pgs.
U.S. Appl. No. 10/606,410, Non Final Office Action mailed Mar. 17, 2011, 9 pgs.
U.S. Appl. No. 10/606,410, Response filed Jun. 2, 2011 to Non Final Office Action mailed Mar. 17, 2011, 12 pgs.
U.S. Appl. No. 12/416,088, Non Final Office Action mailed May 27, 2011, 7 pgs.
U.S. Appl. No. 10/606,410, Non Final Office Action mailed Aug. 17, 2011, 9 pgs.
U.S. Appl. No. 10/606,410, Response Filed Nov. 7, 2011 to Non-Final Office Action Received Aug. 17, 2011, 15 pgs.
U.S. Appl. No. 12/416,088, Notice of Allowance mailed Nov. 16, 2011, 5 pgs.
U.S. Appl. No. 13/080,426, Non Final Office Action mailed Oct. 31, 2011, 8 pgs.
Application Serial No., Response filed Aug. 25, 2011 to Non Final Office Action mailed May 27, 2011, 10 pgs.
U.S. Appl. No. 10/606,410, Advisory Action mailed Mar. 8, 2012, 3 pgs.
U.S. Appl. No. 10/606,410, Final Office Action Mailed Jan. 3, 2012, 10 pgs.
U.S. Appl. No. 12/783,458, Non Final Office Action mailed Mar. 8, 2012, 16 pgs.
Morin, Lee M.E., "Multilingual Communications Device", U.S. Appl. No. 08/200,049, filed Feb. 22, 1994, (Mar. 2, 2004), 7 pgs.
U.S. Appl. No. 10/606,410, Appeal Brief Filed May 25, 2012, 27 pgs.
U.S. Appl. No. 10/605,410, Decision on Pre-Appeal Brief mailed Apr. 20, 2012, 2 pgs.
U.S. Appl. No. 10/606,410, Examiner's Answer to Appeal Brief mailed Jul. 19, 2012, 10 pgs.
U.S. Appl. No. 10/605,410, Final Office Action Mailed Jan. 3, 2012, 10 pgs.
U.S. Appl. No. 10/606,410, Response filed Feb. 10, 2012 to Final Office Action mailed Jan. 3, 2012, 16 pgs.
U.S. Appl. No. 12/693,275, Response filed Mar. 19, 2012 to Non Final Office Action mailed Dec. 30, 2011, 13 pgs.
U.S. Appl. No. 12/693,275, Non Final Office Action Mailed Dec. 30, 2011, 6 pgs.
U.S. Appl. No. 12/693,275, Notice of Allowance mailed May 8, 2012, 11 pgs.
U.S. Appl. No. 12/783,458, Response filed Jun. 8, 2012 to Non Final Office Action mailed Mar. 8, 2012, 9 pgs.
U.S. Appl. No. 13/080,426, Notice of Allowance mailed Jan. 26, 2012, 7 pgs.
U.S. Appl. No. 13/080,426, Notice of Allowance mailed Apr. 23, 2012, 7 pgs.
U.S. Appl. No. 13/080,426, Response filed Dec. 28, 2011 to Non Final Office Action mailed Oct. 31, 2011, 9 pgs.
U.S. Appl. No. 10/606,410, Amendment filed Sep. 13, 2012, 16 pgs.
U.S. Appl. No. 10/606,410, Non Final Office Action mailed Sep. 27, 2012, 10 pgs.
U.S. Appl. No. 10/606,410, Pre-Appeal Brief Request filed Mar. 26, 2012, 5 pgs.
U.S. Appl. No. 12/783,458, Final Office Action mailed Sep. 25, 2012, 12 pgs.
U.S. Appl. No. 13/489,646, Non Final Office Action mailed Sep. 19, 2012, 8 pgs.
U.S. Appl. No. 10/252,128, Appeal Decision mailed Jan. 31, 2013, 6 pgs.
U.S. Appl. No. 10/606,410, Response filed Dec. 11, 2012 to Non Final Office Action mailed Sep. 27, 2012, 16 pgs.
U.S. Appl. No. 10/606,410, Final Office Action mailed Apr. 10, 2013, 15 pgs.
U.S. Appl. No. 13/489,646, 312 Amendment filed Mar. 7, 2013, 4 pgs.
U.S. Appl. No. 13/489,646, Notice of Allowance mailed Jan. 10, 2013, 7 pgs.
U.S. Appl. No. 13/489,646, PTO Response to 312 Amendment mailed Mar. 14, 2013, 2 pgs.
U.S. Appl. No. 13/489,646, Response filed Dec. 3, 2012 to Non Final Office Action mailed Sep. 19, 2012, 11 pgs.
U.S. Appl. No. 13/550,233, Non Final Office Action mailed Mar. 26, 2013, 12 pgs.
U.S. Appl. No. 09/602,110, Appeal Decision mailed May 29, 2013, 10 pgs.
U.S. Appl. No. 09/602,110, Examiner's Answer to Appeal Brief mailed Mar. 7, 2007, 13 pgs.
U.S. Appl. No. 09/602,110, Non Final Office Action mailed Aug. 14, 2013, 20 pgs.
U.S. Appl. No. 09/976,301, Examiner Interview Summary mailed Dec. 8, 2006, 4 pgs.
U.S. Appl. No. 10/252,126, Decision on Appeal mailed Sep. 15, 2010, 8 pgs.
U.S. Appl. No. 10/252,126, Examiner Interview Summary mailed Oct. 26, 2007, 1 pg.
U.S. Appl. No. 10/252,128, Decision on Appeal mailed Jan. 31, 2013, 6 pgs.

(56) References Cited

OTHER PUBLICATIONS

U.S. Appl. No. 10/252,128, Notice of Allowance mailed May 30, 2013, 9 pgs.
U.S. Appl. No. 10/606,410, Advisory Action mailed Jul. 1, 2013, 4 pgs.
U.S. Appl. No. 10/606,410, Response filed Jun. 10, 2013 to Final Office Action mailed Apr. 10, 2013, 19 pgs.
U.S. Appl. No. 12/783,458, Response filed Aug. 15, 2013 to Non Final Office Action mailed May 10, 2013, 9 pgs.
U.S. Appl. No. 12/783,458, Non Final Office Action mailed May 10, 2013, 12 pgs.
U.S. Appl. No. 12/783,458, Response filed Jan. 18, 2013 to Final Office Action mailed Sep. 25, 2012, 10 pgs.
U.S. Appl. No. 13/550,233, Response filed Jun. 24, 2013 to Non Final Office Action mailed Mar. 26, 2013, 14 pgs.
U.S. Appl. No. 10/252,128, Notice of Allowance mailed Dec. 23, 2013, 10 pgs.
U.S. Appl. No. 13/550,233, Notice of Allowance mailed Jan. 8, 2014, 11 pgs.
U.S. Appl. No. 13/550,233, Response filed Dec. 20, 2013 to Final Office Action mailed Oct. 30, 2013, 9 pgs.
U.S. Appl. No. 09/602,110, Final Office Action mailed Nov. 25, 2013, 18 pgs.
U.S. Appl. No. 09/602,110, Response filed Nov. 14, 2013 to Non Final Office Action mailed Aug. 14, 2013, 21 pgs.
U.S. Appl. No. 12/783,458, Notice of Allowance mailed Sep. 24, 2013, 6 pgs.
U.S. Appl. No. 13/550,233, Final Office Action mailed Oct. 30, 2013, 7 pgs.
U.S. Appl. No. 09/602,110, Decision on Pre-Appeal Brief mailed Mar. 28, 2014, 2 pgs.
U.S. Appl. No. 09/602,110, Pre-Appeal Brief Request filed Mar. 20, 2014, 5 pgs.
U.S. Appl. No. 14/165,434, Preliminary Amendment filed Jun. 6, 2014, 7 pgs.
U.S. Appl. No. 14/231,613, Preliminary Amendment Apr. 14, 2014, 8 pgs.
U.S. Appl. No. 14/231,624, Preliminary Amendment filed Apr. 14, 2014, 9 pgs.
U.S. Appl. No. 14/231,633, Preliminary Amendment Apr. 14, 2014, 8 pgs.
U.S. Appl. No. 14/231,639, Preliminary Amendment Apr. 11, 2014, 8 pgs.
U.S. Appl. No. 14/231,650, Preliminary Amendment filed Apr. 9, 2014, 8 pgs.
U.S. Appl. No. 14/231,684, Preliminary Amendment filed Apr. 9, 2014, 8 pgs.
U.S. Appl. No. 14/231,696, Non Final Office Action mailed Jul. 31, 2014, 18 pgs.
U.S. Appl. No. 14/231,696, Preliminary Amendment filed Apr. 9, 2014, 8 pgs.
U.S. Appl. No. 14/231,706, Preliminary Amendment filed Apr. 9, 2014, 8 pgs.
U.S. Appl. No. 14/231,719, Preliminary Amendment filed Apr. 9, 2014, 8 pgs.
U.S. Appl. No. 14/231,722, Preliminary Amendment filed Apr. 9, 2014, 8 pgs.
U.S. Appl. No. 14/268,986, Preliminary Amendment filed May 5, 2014, 7 pgs.
U.S. Appl. No. 14/268,986, Supplemental Preliminary Amendment filed May 9, 2014, 7 pgs.
"Stamps.com Becomes the Standard in Internet Mailing and Shipping for Top Auction Resource and Trading Sites", Stamps.com: PR Newswire Mar. 15, 2000, PQDialog #449383612, [Online]. Retrieved from the Internet: <URL: http://search.proquest.com/professional/docview/449383612?accountid=161862>, (Mar. 15, 2000), 6 pgs.
"Yahoo! Launches Yahoo! PayDirect for Online Person-to-Person Payments; Relationship with CI BC National Bank Allows Consumers to Easily Send and Receive Payments Via Email", Business Editors & High-Tech Writers. Business Wire, [Online]. Retrieved from the Internet: <URL: http://search.proquest.com/professional/docview/445932440?accountid=161862>, (Jul. 31, 2000), 4 pgs.
U.S. Appl. No. 09/602,110, Final Office Action mailed Sep. 10, 2014, 19 pgs.
U.S. Appl. No. 14/231,696, Response filed Oct. 31, 2014 to Non Final Office Action mailed Jul. 31, 2014, 23 pgs.
U.S. Appl. No. 14/231,719, Non Final Office Action mailed Aug. 14, 2014, 12 pgs.
U.S. Appl. No. 14/231,719, Response filed Nov. 12, 2014 to Non Final Office Action mailed Aug. 14, 2014, 17 pgs.
U.S. Appl. No. 14/268,986, Notice of Non-Compliant Amendment mailed Aug. 12, 2014, 3 pgs.
U.S. Appl. No. 14/268,986, Response filed Nov. 12, 2014 to Notice of Non-Compliant Amendment mailed Aug. 12, 2014, 3 pgs.
U.S. Appl. No. 14/595,074, Preliminary Amendment filed Jan. 19, 2015, 10 pgs.
U.S. Appl. No. 14/231,624, Non Final Office Action mailed May 22, 2015, 18 pgs.
U.S. Appl. No. 14/231,633, Non Final Office Action mailed Mar. 24, 2015, 16 pgs.
U.S. Appl. No. 14/231,650, Non Final Office Action mailed Mar. 3, 2015, 18 pgs.
U.S. Appl. No. 14/231,684, Non Final Office Action mailed Mar. 3, 2015, 16 pgs.
U.S. Appl. No. 14/231,696, Final Office Action mailed Feb. 24, 2015, 22 pgs.
U.S. Appl. No. 14/231,706, Non Final Office Action mailed Mar. 25, 2015, 15 pgs.
U.S. Appl. No. 14/231,719, Final Office Action mailed Feb. 24, 2015, 16 pgs.
U.S. Appl. No. 14/231,722, Non Final Office Action mailed Feb. 25, 2015, 13 pgs.
U.S. Appl. No. 14/595,074, Pre-Interview First Office Action mailed Apr. 2, 2015, 4 pgs.
"Stamp.com Launches New iShip Service Offering to Automate Office-Based Shipping", PR Newswire, PQDialog #448531788, (Jun. 14, 2000), 7 pgs.
U.S. Appl. No. 14/231,633, Response filed Aug. 5, 2015 to Non Final Office Action mailed Mar. 24, 2015, 11 pgs.
U.S. Appl. No. 14/231,639, Non Final Office Action mailed Jul. 16, 2015, 19 pgs.
U.S. Appl. No. 14/231,650, Response filed Aug. 3, 2015 to Non Final Office Action mailed Mar. 3, 2015, 11 pgs.
U.S. Appl. No. 14/231,684, Response filed Aug. 3, 2015 to Non Final Office Action mailed Mar. 3, 2015, 10 pgs.
U.S. Appl. No. 14/231,696, Response filed Jul. 24, 2015 to Final Office Action mailed Feb. 24, 2015, 12 pgs.
U.S. Appl. No. 14/231,706, Response filed Jul. 13, 2015 to Non Final Office Action mailed Mar. 25, 2015, 10 pgs.
U.S. Appl. No. 14/231,719, Response filed Jul. 13, 2015 to Final Office Action mailed Feb. 24, 2015, 11 pgs.
U.S. Appl. No. 14/231,722, Response filed Jul. 13, 2015 to Non Final Office Action mailed Feb. 25, 2015, 9 pgs.
U.S. Appl. No. 14/268,986, Non Final Office Action mailed Jul. 2, 2015, 13 pgs.
U.S. Appl. No. 14/595,074, Pre-Interview First Office Action mailed Jun. 22, 2015, 4 pgs.
U.S. Appl. No. 14/595,074, Response filed Jun. 2, 2015 to First Office Action Interview Pilot Program Pre-Interview mailed Apr. 2, 2015, 2 pgs.
"Stamp.com Launches New iShip Service Offering to Automate Office-Based Shipping", PR Newswire, PQDialog #448531788, (Jun. 14, 2000), 5 pgs.
"Yahoo! Launches Yahoo! Pay-direct for Online Person-to-Person Payments; Relationship With CIBC National Bank Allows Consumers to Easily Send and Receive Payments Via Email", Business Wire, PQ Dialog #445932440, (Jul. 31, 2000), 4 pgs.

* cited by examiner

METHOD AND SYSTEM TO DISPLAY AND SEARCH IN A LANGUAGE INDEPENDENT MANNER

FIELD OF THE INVENTION

The present invention relates generally to search systems. One embodiment relates to a method and system for displaying items and searching for items in a language independent manner.

BACKGROUND OF THE INVENTION

The emergence of electronic commerce, including online auction sites as well as fixed-price sites, has revolutionized the manner in which goods and services may be bought and sold. In particular, the development of network based commerce systems has enabled individuals to sell items with relatively little effort or expense while at the same time reaching a much larger potential pool of buyers than using more traditional means such as classified advertising and garage sales. In fact, an Internet enabled commerce site can extend well beyond geographical and cultural boundaries, potentially having a global reach. Consequently, one of the difficult challenges in developing a network based electronic commerce site is developing a site that allows sellers and buyers to communicate despite potential language barriers.

In a typical electronic commerce system, a seller posts an item for sale and describes the particular item in his or her native language. Unless a potential buyer can read and understand the seller's native language, the potential buyer will have no way of finding or understanding the seller's posting. Consequently, there is little if any chance that a potential buyer and a seller that have different native languages will ever enter into a transaction.

SUMMARY OF THE INVENTION

In accordance with one aspect of the present invention, there is provided a method and system to facilitate an item search in a language independent manner. A search attribute specified in a particular language is received from a user. The search attribute includes an attribute name and an attribute value. The search attribute is translated or converted into a language independent symbol. Then, using the language independent symbol, a search is performed to select item listings having item attributes, expressed as language independent symbols, corresponding to the translated or converted search attribute.

In accordance with a second aspect of the invention, there is provided a method and system to display an item listing in a language independent manner. An item listing is retrieved from a database. The item listing has one or more associated attributes and each attribute includes an attribute name and an attribute value. Each attribute name and attribute value is stored in an item listing table of a database as a language independent symbol, such as a number. Upon retrieval from the item listing table, the attribute name and attribute value are translated or converted into a specific language using a language-specific look-up table to map the numbers to attribute names and attribute values in a specific language. Then, the item listing is presented to a user with the attribute name and attribute value displayed in the specific language.

Other aspects of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings, in which like references indicate similar elements, and in which.

DETAILED DESCRIPTION

A method and system to display items and search for items in a language independent manner are described. In the following description, for purposes of explanation, numerous specific details are set forth in order to provide a thorough understanding of the present invention. It will be evident, however, to one skilled in the art that the present invention may be practiced without these specific details.

Figure 1:
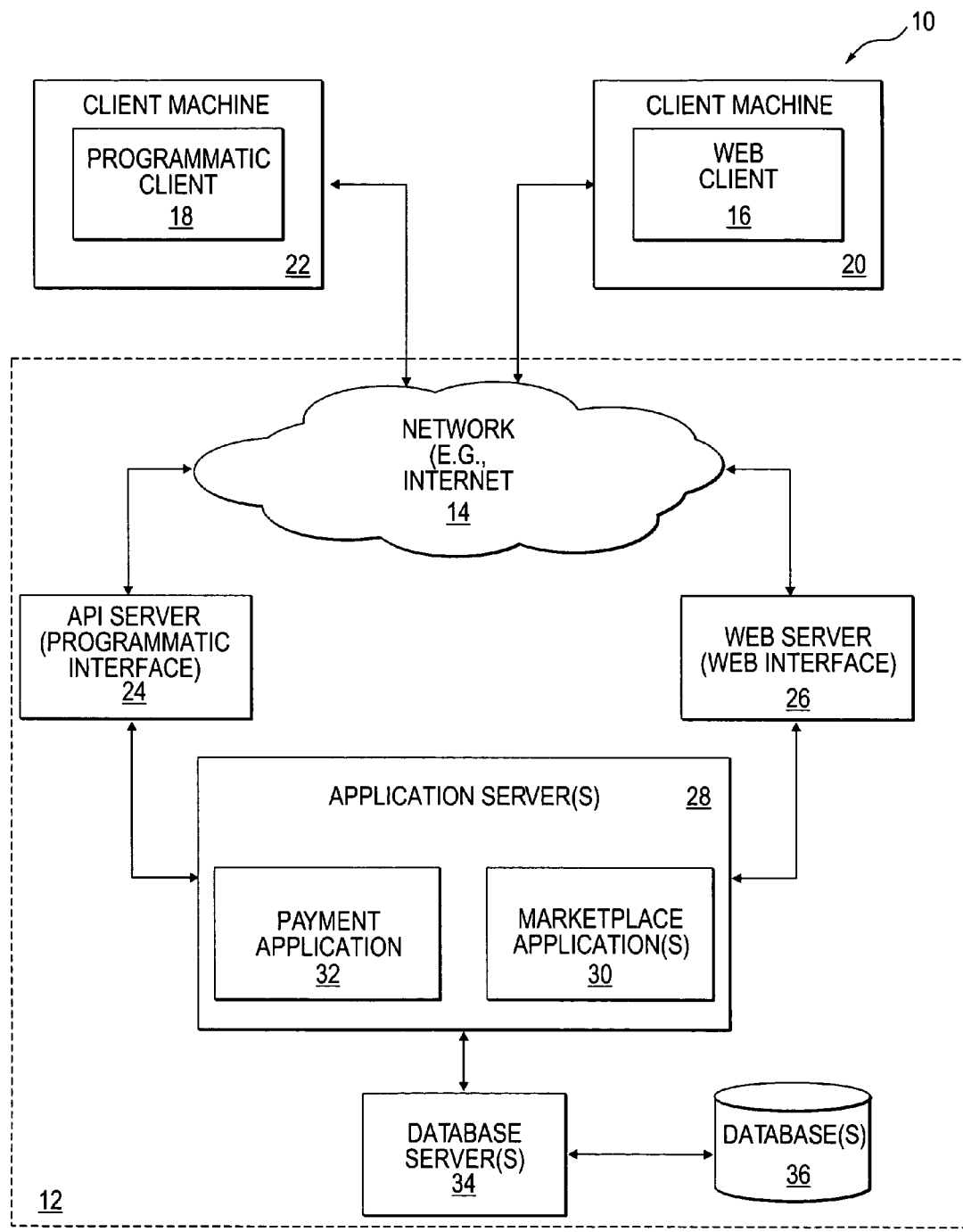
FIG. 1 shows a schematic block diagram of an exemplary network-based system in the form of an online marketplace according to one embodiment of the present invention.

FIG. 1 is a network diagram depicting a system 10, according to one embodiment of the present invention, having a client-server architecture. A network-based system, in the exemplary form of an online marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Washington State), and a programmatic client 18 executing on respective client machines 20 and 22. While the exemplary embodiment is below described in the context of the marketplace 12, the invention is of course not so limited and may find application in a broad range of system types.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

The database 36 (which may comprise several distributed databases) may store listings (including both goods and services) that are up for auction and/or sale to users via the Internet 38. As shown in FIG. 1, the database 36 may be maintained by, and accessed via, the database server 34, which at least partially implements and supports the online marketplace 12. The database 36 may be a relational database, and include a number of tables having entries, or records, that are linked by indices and keys.

Figure 2:
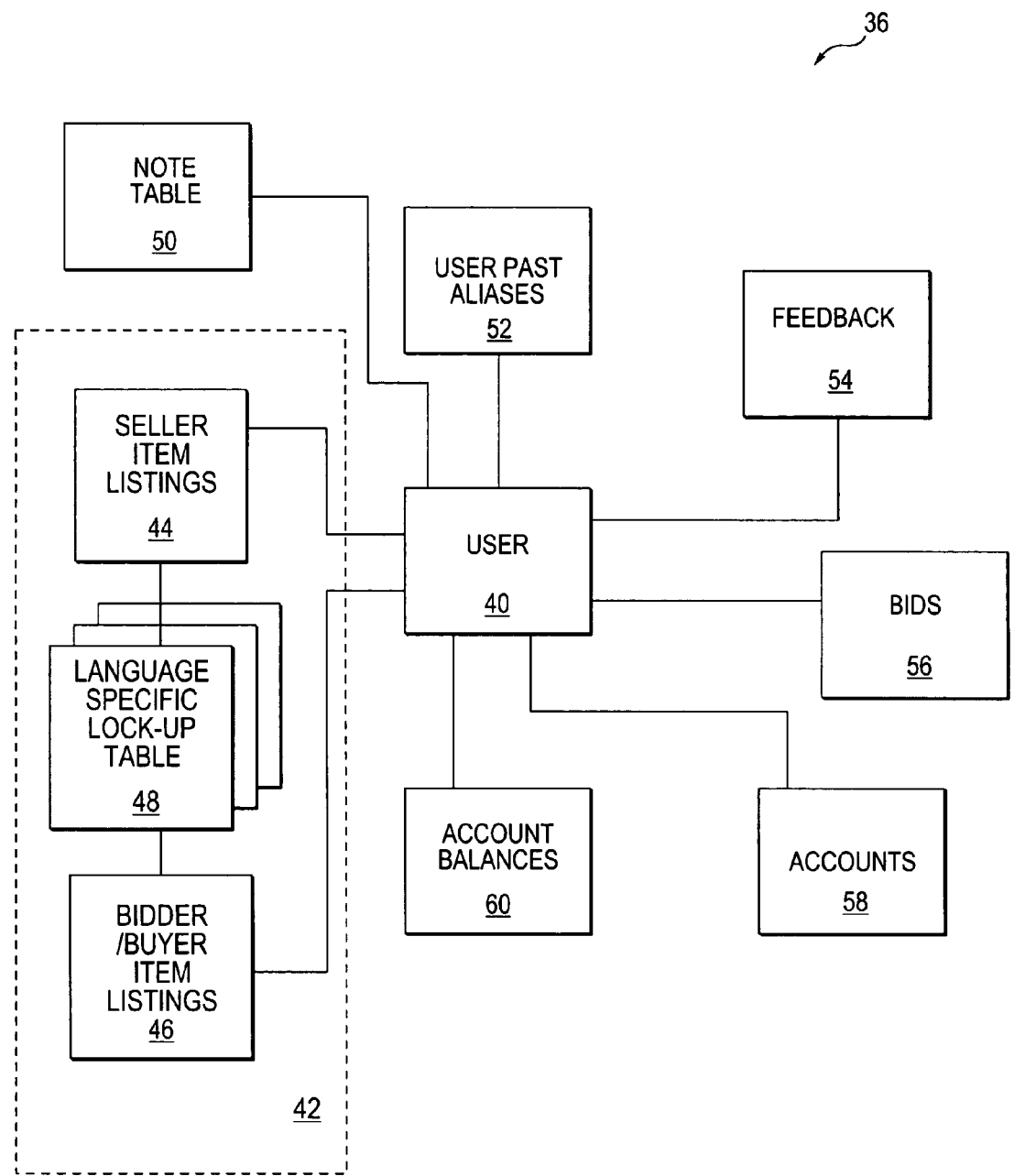
FIG. 2 shows a schematic diagram illustrating an exemplary database, maintained by, and accessed via a database engine server, that at least partially implements and supports searching in a language independent manner.

As illustrated in FIG. 2, for one embodiment, central to the database 36 is a user table 40, which contains a record for each user of the network-based marketplace 12. A user may operate as a seller, a buyer, or both, within the network-based marketplace 12. The database 36 also includes listings tables 42 that may be linked to the user table 40. In one embodiment, the listings tables 42 include a sellers item listings table 44 and a bidders item listings table 46. For example, the sellers item listings table 44 may contain data related to items listed for sale or auction by a seller, and the bidders item listings table 46 may contain data related to the individual bids on the items listed for sale or auction made by bidders. For one embodiment of the present invention, the listings tables 42 are linked to one or more language-specific look-up tables 48. In addition, a user record in the user table 40 may be linked to multiple listings that are being, or have been, auctioned or sold via the marketplace 12. A number of other exemplary tables are also shown to be linked to the user table 40, namely a note table 50, a user past aliases table 52, a feedback table 54, a bids table 56, an accounts table 58, and an account balances table 60.

Figure 3:
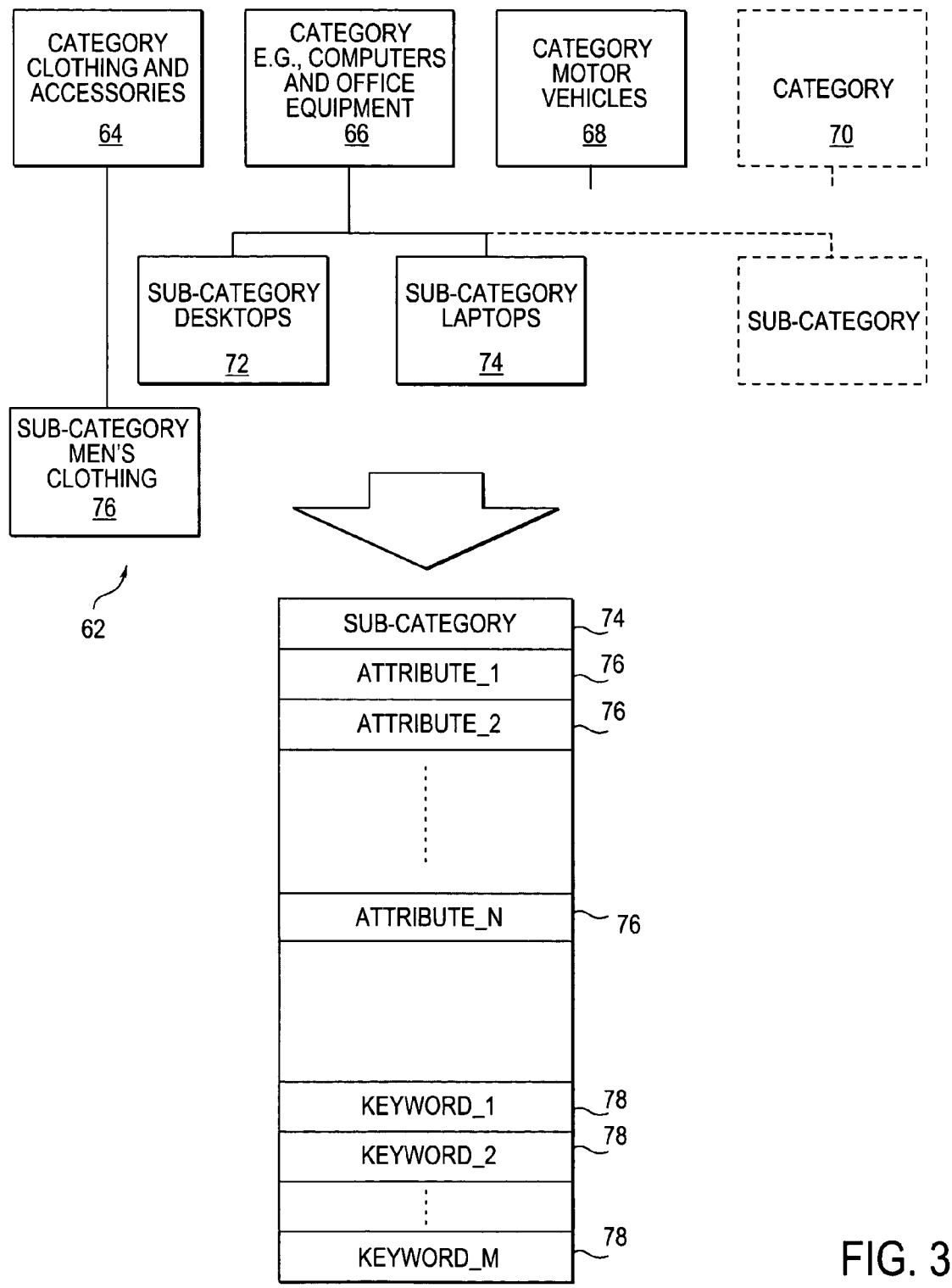
FIG. 3 shows an exemplary category table of a database that includes attributes associated with a category of listings.

Referring to FIG. 3 of the drawings, reference numeral 62 generally indicates an exemplary arrangement of listings in the sellers item listings table 44. In one embodiment, listings of products posted for sale and/or auction on the network-based marketplace 12 are arranged in categories 64 to 70. It is to be appreciated that the number of categories may vary depending upon the nature of the network-based marketplace 12. Exemplary categories that may be included are Clothing and Accessories 64, Computers and Office Equipment 66, Motor Vehicles 68, Arts and Antiques (not shown), Musical Instruments (not shown), Pottery and Glass (not shown), Real Estate (not shown), and the like. Each category 64 to 70 may include one or more sub-categories which may group listings in a particular category. For example, the Computers and Office Equipment category 66 may include a "Desktops" sub-category 72, a "Laptops" sub-category 74, a "Monitors" sub-category (not shown), and so on. Each sub-category 72, 74 may, in turn, include further details such as a plurality of attributes 76 as well as a plurality of keywords 78 which are associated with a particular category 64 to 70. For example, the Laptops sub-category 74 may include attributes 76 such as, processor speed, screen size, manufacturer, or any other attributes that may be associated with the particular listing. In one embodiment, the categories are arranged in a so-called "tree-structure" wherein sub-categories, and so on, may be provided.

Throughout the detailed description, the invention is discussed in the context of a motorcycle listing posted by a German seller under the category of motor vehicles and displayed in a search result in English. However, it is appreciated that this is simply an example, and the invention can be implemented to work with any number of languages and in any number of categories. In addition, it is to be appreciated that the number and type of attributes 76 associated with any category 64 to 70 may differ from one category to another. For example, as the category 64 relates to clothing, then a sub-category 76 may, for example, relate to men's pants and shorts and the attributes 76 may be associated with style, size, color, condition, minimum price, maximum price, and so on. Thus, the number and nature of the attributes 76 may differ from one embodiment to another and/or within the same embodiment.

Figure 4:
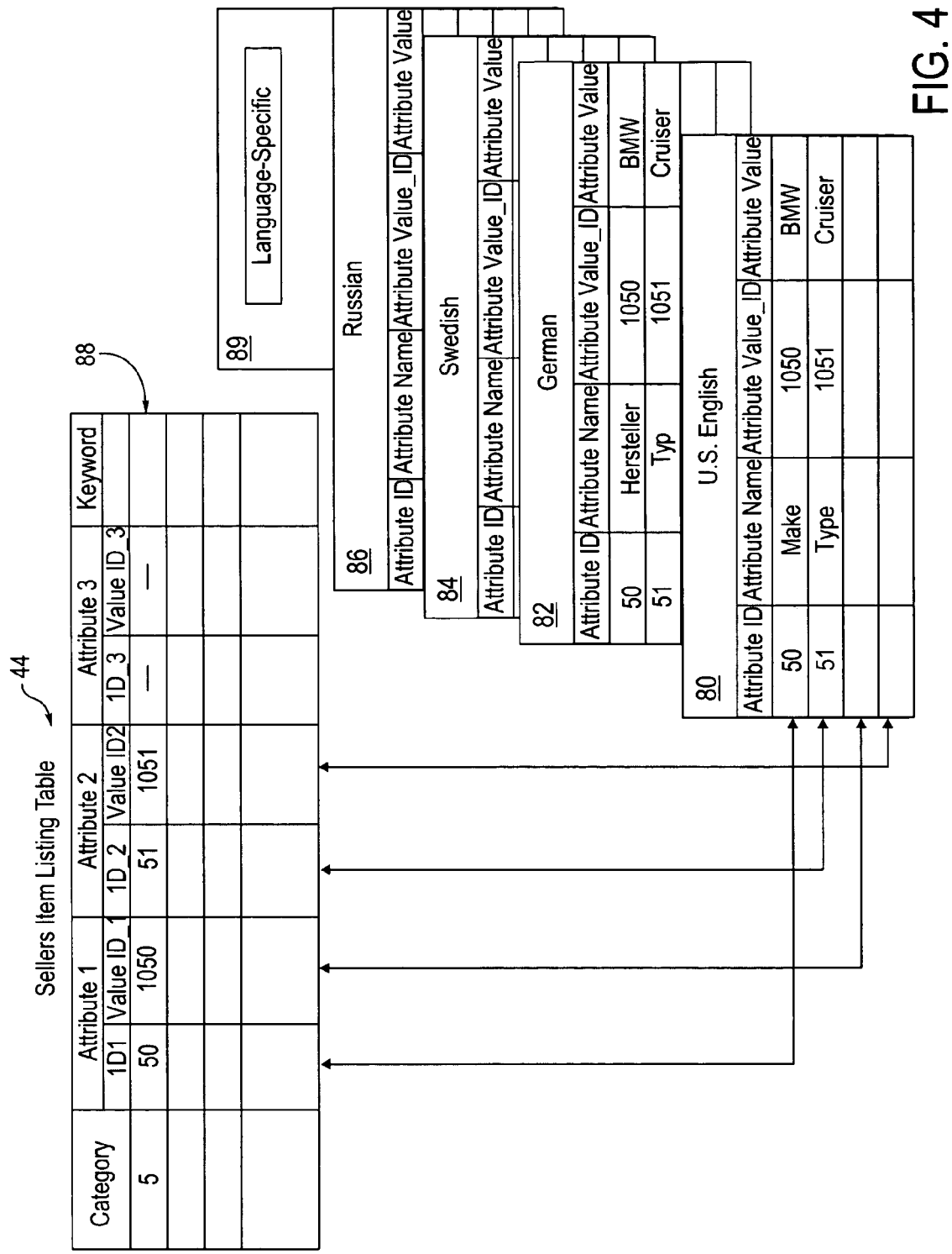
FIG. 4 is a schematic diagram illustrating item listing and language-specific look-up database tables according to an exemplary network-based commerce facility.

FIG. 4 is a schematic diagram illustrating a sellers item listings table 44 and several language-specific look-up tables according to an exemplary network-based commerce facility. As illustrated in FIG. 3, the network-based marketplace 12 may generally be implemented with a wide variety of database tables, but for the sake of clarity in describing the present invention, only the tables relevant to the present invention are illustrated and described in detail. In addition to the sellers item listings table 44, FIG. 4 includes language-specific look-up tables 80, 82, 84, 86 and 48. Each of the language-specific look-up tables maps a column of attribute names to a column of attribute IDs, where the attribute names are expressed in the particular language of the language-specific table and the attribute IDs are expressed as language independent symbols, such as numbers. Similarly, the language-specific look-up tables map a column of attribute values to a column of attribute value IDs. While numbers are used as language independent symbols in the example discussed in FIG. 4, any language independent symbol could be used to represent the various attribute names and attribute values. For example, in an alternative embodiment, punctuation marks or coded groupings of characters could be used to represent the various attribute names and attribute values.

As illustrated in FIG. 2, the U.S. English look-up table 80 includes a column of attribute IDs with a corresponding column of attribute names specified in English. For example, in U.S. English look-up table 80, attribute ID "50" directly maps to the attribute name "Make." Similarly, in the German look-up table 82, attribute ID "50" maps directly to corresponding attribute name "Hersteller," which is the German language equivalent of the English attribute name for "Make." Each language-specific look-up table 48, including the Swedish look-up table 84 and the Russian look-up table 86, maps the attribute ID "50" to an attribute name corresponding to the language-specific word for "Make."

Similarly, each language-specific look-up table 48 maps a column of attribute value IDs to a column of corresponding attribute values. Just as the attribute names are specified in the language of the language-specific look-up table, so too are the attribute values specified in the language of the language-specific look-up table. For example, as illustrated in FIG. 4, the attribute value ID "1051" maps to the attribute value "Cruiser" in the U.S. English look-up table 80. The attribute value ID "1051" maps to the German equivalent of "Cruiser" in the German look-up table 82, to the Swedish equivalent of "Cruiser" in the Swedish look-up table 84, and to the Russian equivalent of "Cruiser" in the Russian look-up table 86.

For one embodiment, each language-specific look-up table is developed and maintained by an administrator of the network-based commerce system 12. While FIG. 4 illustrates language-specific look-up tables 48 for four different languages, U.S. English, German, Swedish, and Russian, it will be appreciated that any number of look-up tables can be implemented to suit the needs of the particular geographical regions in which the network-based commerce system 10 will be deployed.

The seller listing table 44 stores data related to items posted for sale on the network-based commerce system 10. For purposes of this invention, the term "posted" is synonymous with "listed" and generally refers to the act of making the item available for sale on a network-based marketplace, whether by auction or in a fixed-price marketplace. As will be discussed in greater detail below, when a seller posts an item for sale, the seller will select one or more attributes to describe the item. For example, if a seller is posting a motorcycle for sale, the seller might be prompted to enter information related to the motorcycle, such as the make, model and year of the motorcycle. As such, each record in the sellers item listings table 44 includes a category or sub-category, one or more item attributes, and one or more keywords.

For purposes of the present invention a search attribute is an attribute used to search for an item and an item attribute is an attribute associated with an item at the time of posting. For one embodiment, only item attributes that are presently associated with an item available for sale or auction will be displayed as search attribute selections. However, in an alternative embodiment, any number of search attributes might be selected, regardless of whether there are any matching item attributes associated with an actual item available for sale or auction.

As illustrated in FIG. 4, for one embodiment of the present invention, attributes input by a seller are stored in the sellers item listings table 44 as numbers. For example, row 88 represents an item listing for a motorcycle. In the exemplary sellers item listings table 44 illustrated in FIG. 2, the sub-category column determines the particular type of item. For example, in row 46 the sub-category number is "5" representing a motorcycle listing. For one embodiment a category table (not shown) maps category and/or sub-category numbers to different category items. The motorcycle listing represented by row 46 has attributes defined for Attribute 1 and Attribute 2. For example, under Attribute 1 in table 44, the listing has values "50" and "1050" for attribute ID_1 and attribute value ID_1 respectively. Using the U.S. English look-up table, "50", the value for attribute ID_1, corresponds to "Make." Similarly, "1050", the attribute value for attribute value ID_1, corresponds to "BMW." As such, the motorcycle listing represented by row 46 is for a BMW motorcycle. Similarly, using the English look-up table 80, it is apparent that the motorcycle listing represented by row 88 is of the "Cruiser" type.

Figure 5:
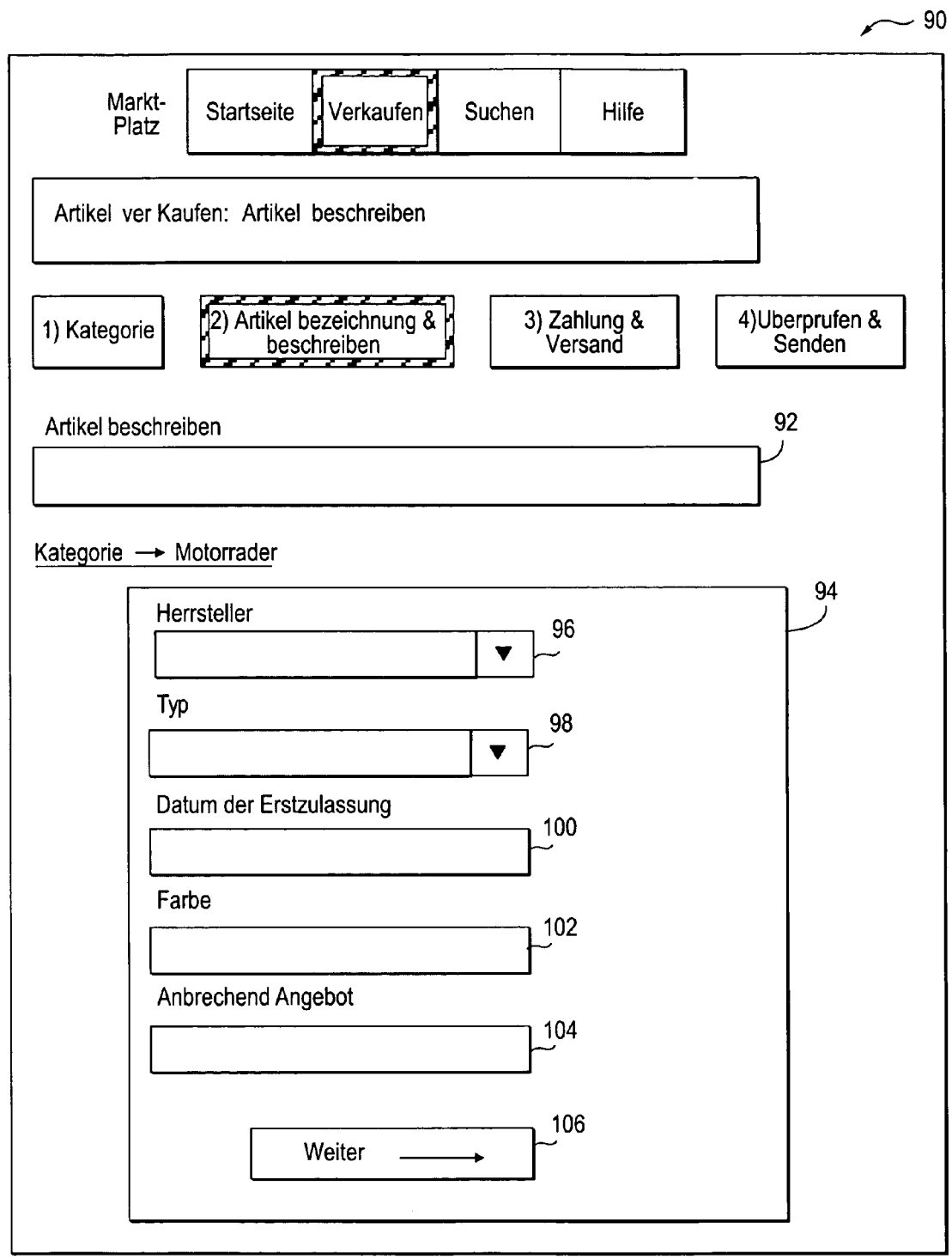
FIG. 5 illustrates a listing creation page in the German language according to an exemplary network-based commerce facility.

FIG. 5 illustrates a listing creation page 90 in the German language according to an exemplary network-based commerce facility. For one embodiment of the invention, a seller who wants to post an item for sale will select a particular category or sub-category under which to post the item. After selecting the category or sub-category, the seller will be presented with a listing creation page 90, as illustrated in FIG. 5, at which the seller will describe the item. The listing creation page 90 illustrated in FIG. 5 is in the German language to accommodate a seller whose native language is German. There are several mechanisms that can be used to determine the particular language that is presented to a seller. For one embodiment, the IP address of the seller's network device is determined and, based on a known mapping of IP addresses, the server determines a language in which to display web pages. Alternatively, web pages may be displayed to a user based on a selected language stored in a user's profile.

Depending on the particular category or sub-category that a seller has selected, the listing creation page 90 may prompt the seller to select, or otherwise provide, several item attribute values that describe the item being posted. For example, the listing creation page 90 illustrated in FIG. 5 is for a motorcycle listing. At text input box 92, the seller is prompted to provide a brief description to identify the listing and serve as the title or heading of the item listing. The seller is also prompted to input item attribute values at the drop down menu boxes 96 and 98, as well as at text input boxes 100, 102 and 104. In particular, drop down menu box 96 prompts the seller to input the particular "Herrsteller" (e.g., the German language equivalent of "Make") by selecting from a list of motorcycle manufacturers. Similarly, drop down menu box 98 prompts the seller to select a "Typ" (e.g., the German language equivalent of "Type") by selecting from a list of motorcycle types. Text input boxes 100, 102 and 104 prompt the seller to input item attribute values for the date of manufacture, color and starting bid price respectively. Once the seller has made his selections and input the item attributes, the seller selects the "Weiter" 106 (e.g., the German language equivalent of "continue") button or link to continue.

By selecting the "Weiter" button or link, the attribute values input and selected by the seller are communicated to the network-based marketplace 12. However, before storing the item listing in the sellers item listings table 44, the attribute names and attribute values are converted or translated into numbers using the German language-specific look-up table 80. For example, if the seller selects "BMW" as the attribute value for the "Herrsteller" attribute name, then according to the German language look-up table 82, the attribute name and attribute value are converted or translated to "50" and "1050" respectively. Accordingly, "50" and "1050" are stored in an item listing record 88 in the seller listing table 44.

One of the advantages of storing the attribute names and attribute values as numbers is that the numbers can easily be translated to names and values in any language using a language-specific look-up table 48. This allows a potential buyer to search for products that were originally listed in a language different from the buyer's native language. It also allows for items to be displayed to a potential buyer in a language that is different from the language of the seller that posted the item. In FIG. 4, numbers have been used to represent attribute IDs and attribute value IDs, however, it will be appreciated that any language independent symbol could be used.

Figure 6:
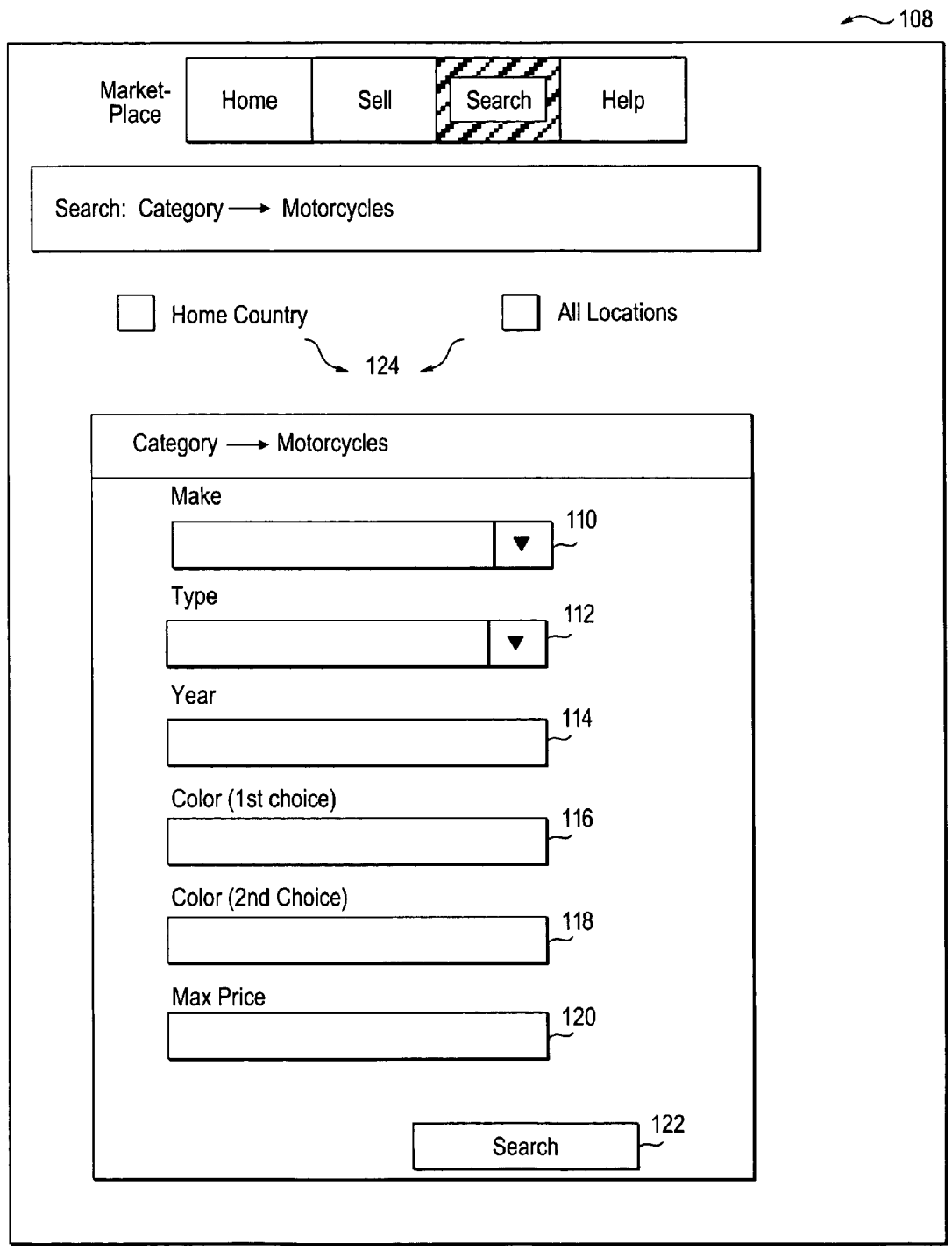
FIG. 6 illustrates a buyer's search page in the English language according to an exemplary network-based commerce facility.

FIG. 6 illustrates a buyer's search page in the English language according to an exemplary network-based commerce facility. For one embodiment of the present invention, a potential buyer selects a category or sub-category of items to search. For example, in FIG. 6 a buyer's search page for motorcycles is illustrated. The "Motorcycle" category might be a sub-category of "Motor Vehicles" for one embodiment of the invention. After selecting a category to search, the buyer is prompted to input or select desired search attributes associated with the item that the user is searching for. For example, as illustrated in FIG. 6, the buyer's search page 108 for the category "Motorcycles" displays drop down menu boxes to select search attributes for "Make" as well as "Type." In addition, the buyer's search page 108 includes input text boxes for such attributes as "Year" 114, "Color" 116, 118, and "Price" 120. After selecting and entering search attribute values for some or all of search attributes 110 through 120, a potential buyer selects the "Search" button 122 to perform a search. Accordingly, the search attributes are communicated to the network-based marketplace 12.

Prior to performing a search of the sellers item listings table 44, database server 34 translates or converts the search attributes 110 through 120 into attribute IDs and attribute value IDs using the U.S. English language look-up table. For example, the search attribute with attribute name "Make" is converted or translated into the attribute ID "50" according to the U.S. English language look-up table. Similarly, assuming the potential buyer selected "BMW" as the attribute value for the search attribute with attribute name "Make" then the attribute value "BMW" would be converted or translated into the attribute value ID "1050." After converting the attribute names and attribute values to numbers, the database server 34 performs a search of the sellers item listings table 44 to find item listings with attributes that match the search attributes 110 through 120 selected by the potential buyer. Accordingly, an item that was posted in Germany by a German seller will be selected if the attribute IDs and attribute value IDs match the translated or converted search attributes selected by the potential buyer, regardless of the language used by the German seller to post the item to the marketplace 12.

Figure 7:
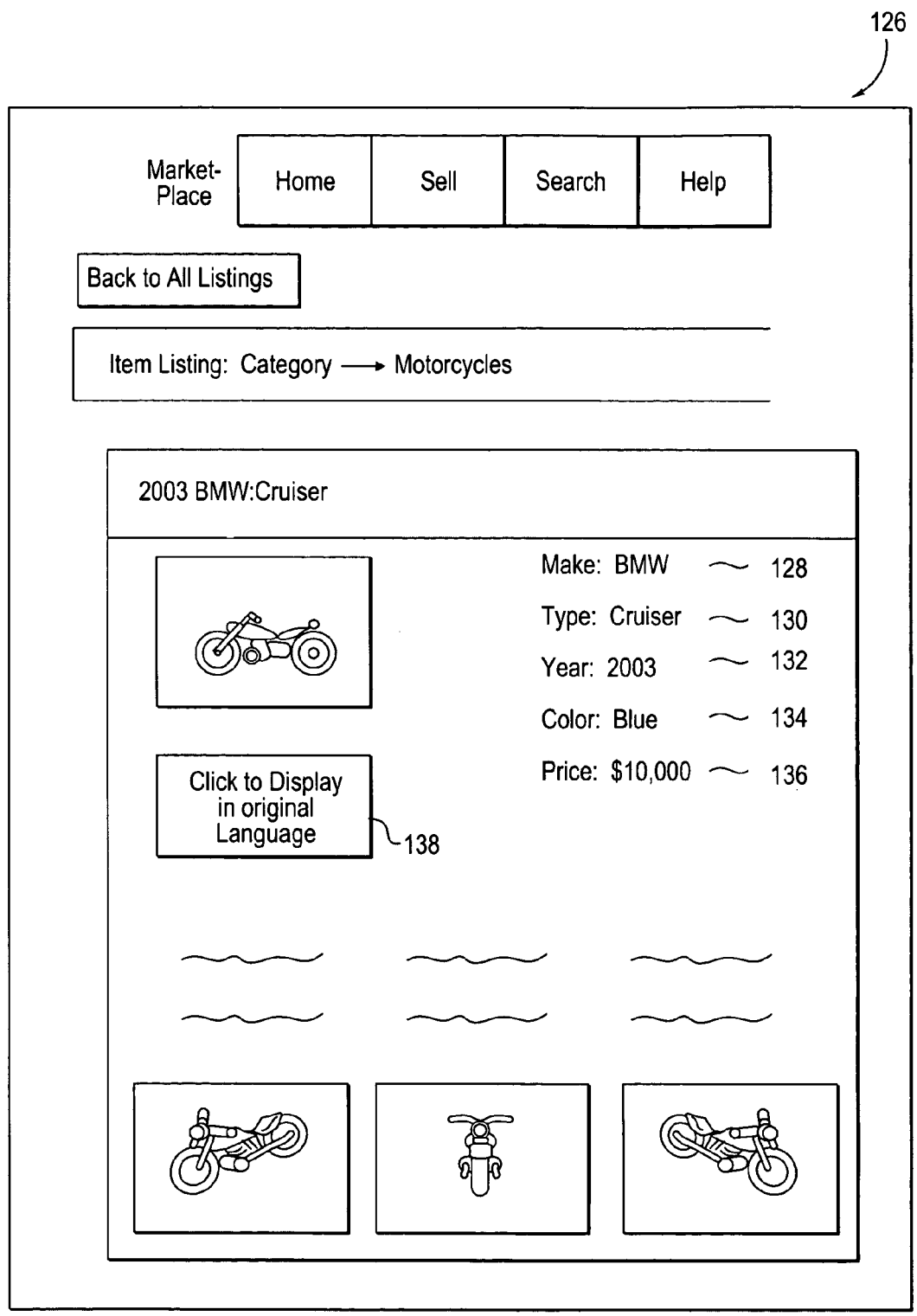
FIG. 7 illustrates an item listing page according to an exemplary network-based commerce facility.

FIG. 7 illustrates an item listing page 126 according to an exemplary network-based commerce facility. The item listing page 126 illustrated in FIG. 7 is displayed in English. In particular, attributes 128 through 136 are displayed in English. For one embodiment, the attributes 128 through 136 are displayed in the native language of the potential buyer that performs a search, regardless of whether the particular item satisfying the search was posted by a seller with a native language different from the potential buyer. For example, if a German seller posts an item using a German listing creation page 90 and specifies attribute values in German, the item listing will nevertheless display the attributes in the native language of the potential buyer. For one embodiment, a toggle button, such as button 138, is displayed on the item listing page 126 to allow the potential buyer to see the attributes displayed in the language in which the item was originally posted. For example, if the motorcycle listing illustrated in item listing page 126 was posted by a seller in Germany whose native language is German, a potential non-German speaking buyer may select button 138 to change the language in which the item listing is displayed from the buyer's native language, to the seller's native language. Selecting the button 138 a second time will change the item listing language back to the potential buyer's native language. This is particularly useful when the non-German speaking buyer would like to see the item listing in the seller's native language, as posted by the seller. In alternative embodiments, the item listing page 126 could display buttons that, when selected, change the attribute display language to a language of the potential buyer's choice.

Figure 8:
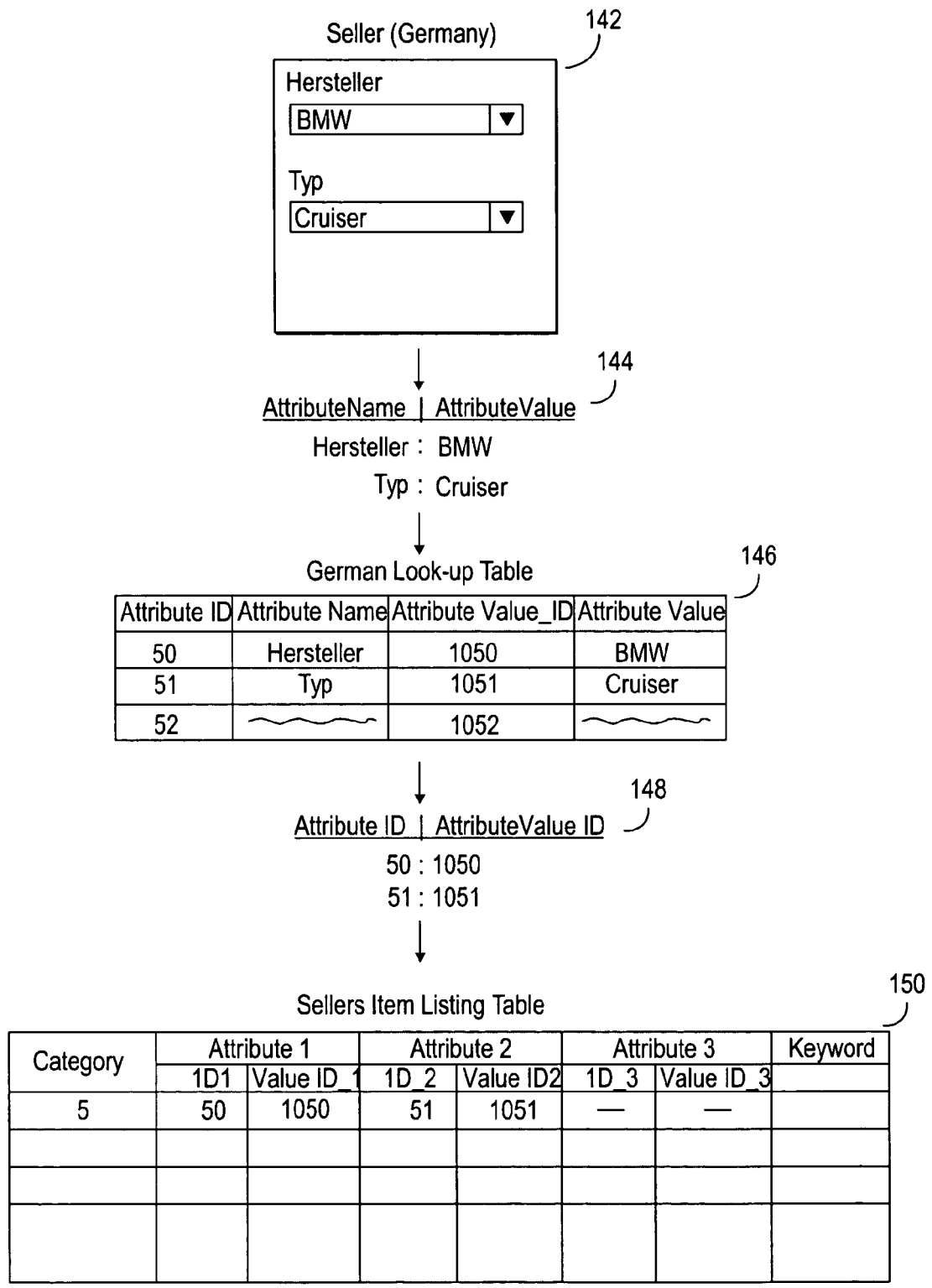
FIG. 8 illustrates a data flow diagram of the operations to post an item for sale according to one embodiment of the invention.
Figure 9:
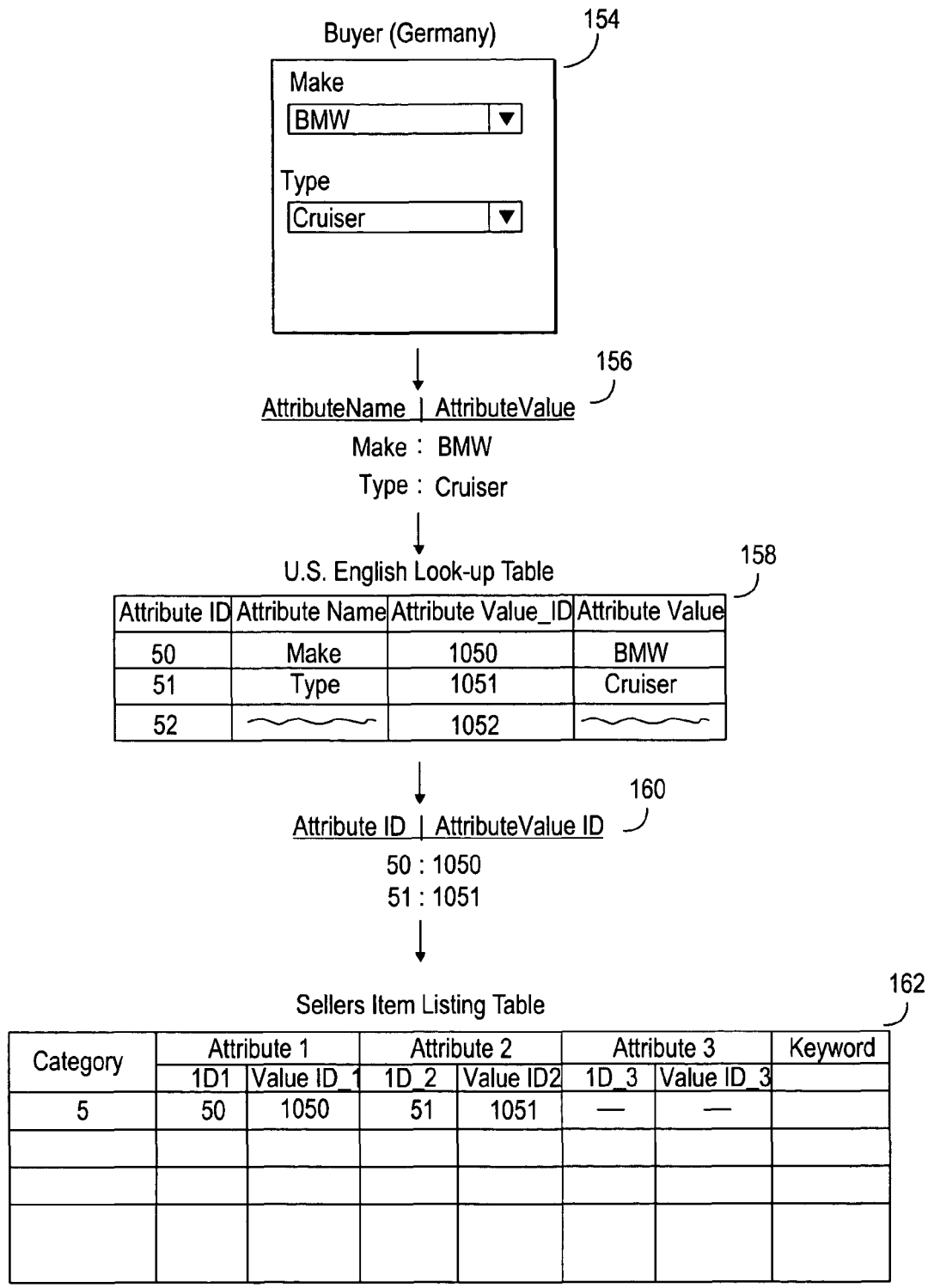
FIG. 9 illustrates a data flow diagram illustrating the operations to perform a language independent search according to one embodiment of the present invention.

FIGS. 8 and 9 illustrate data flow diagrams, according to one embodiment of the invention, for operations to post an item for sale and to search for a posted item, respectively. For one embodiment of the invention, a seller is prompted to select attribute values for one or more attribute names associated with a particular item category or sub-category. Accordingly, at reference numeral 142, a portion of a sellers listing page is shown in German. A German seller selects attribute values for the attribute names "Hersteller" and "Typ." Next, the attribute names and attribute values 144 are communicated to the network-based marketplace 12 via network 14. At reference numeral 146, database server 34 uses a German language-specific look-up table 80 to translate each attribute name and each attribute value into an attribute ID and an attribute value ID respectively. After the translation, at reference numeral 150, each attribute ID 148 and attribute value ID 148 are stored as a record in sellers item listings table 44.

At reference numeral 154 of FIG. 9 a portion of a buyer's search page displayed in English is illustrated. According to one embodiment of the present invention, a buyer specifies attribute values in English for one or more attribute names associated with a particular category or sub-category. After selecting the search attribute values for the corresponding attribute names, the attributes 156 are communicated to database server 34. At database server 34 an English language look-up table 158 is used to translate or convert the attribute names and attribute values into attribute IDs and attribute value IDs. The attribute IDs and attribute value IDs are expressed or represented as numbers. Next, a search of the sellers item listings table 162 is performed using the attribute IDs and attribute value IDs 160 to select listings with matching attributes. Consequently, the search is independent of the particular language in which the listing was originally posted.

Figure 10:
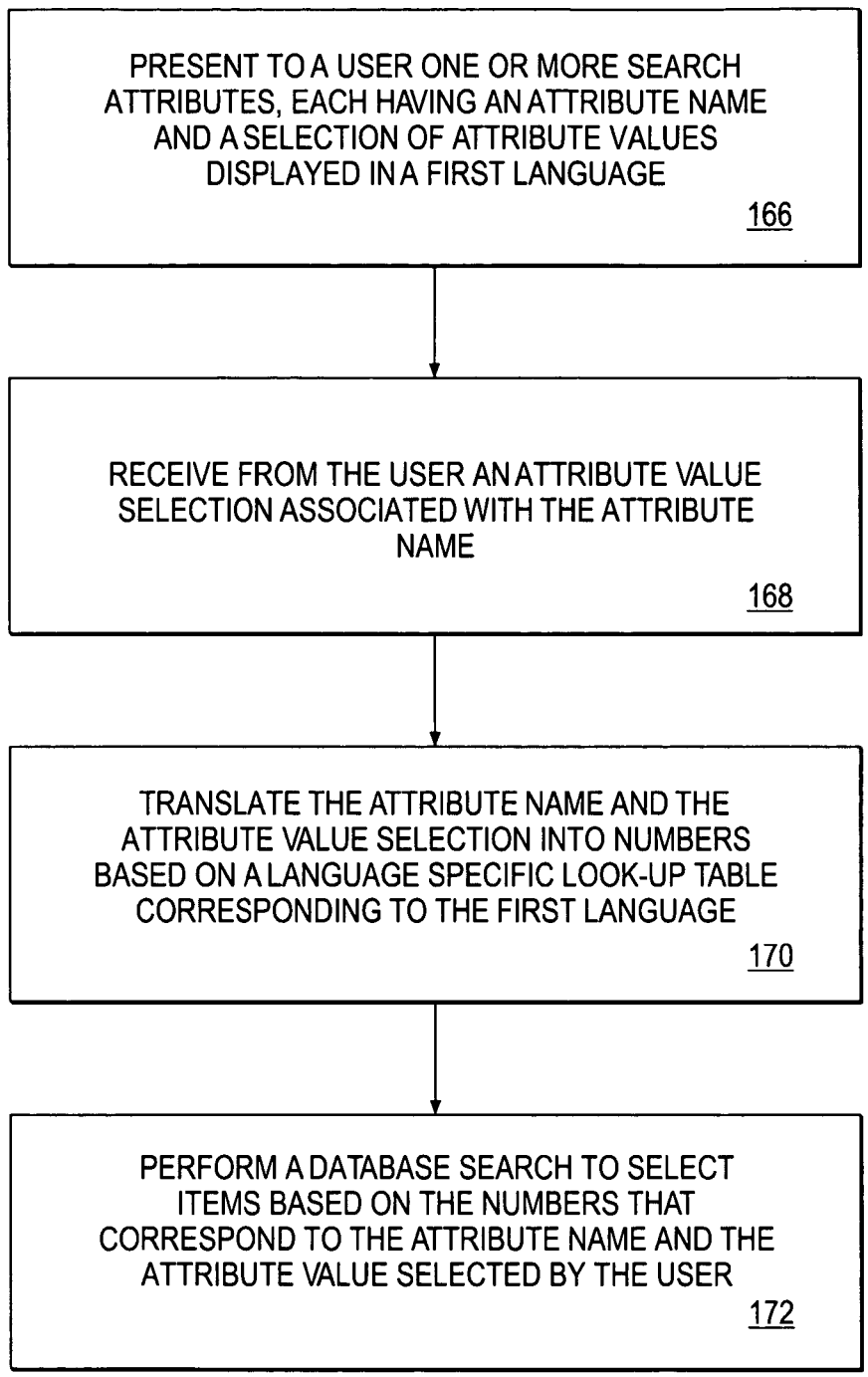
FIG. 10 illustrates a flowchart of the operations to perform a language independent search according to one embodiment of the present invention.

FIG. 10 illustrates a flowchart of the operations 164 to perform a language independent search according to one embodiment of the present invention. At operation 164, a user is presented with one or more search attributes associated with a particular category or sub-category that the user desires to search. Each search attribute has an attribute name and a selection of attribute values. The attribute names and attribute values are presented or displayed to the user in the user's native language.

At operation 168, the user's attribute value selections for each attribute name are received at the network-based marketplace. At operation 170, the attribute names and attribute values are translated into numbers using a language-specific look-up table that corresponds to the language in which the attribute names and attribute values are presented. Finally, the translated attribute names and values are used to perform a database search of the sellers item listings table at operation 172.

Figure 11:
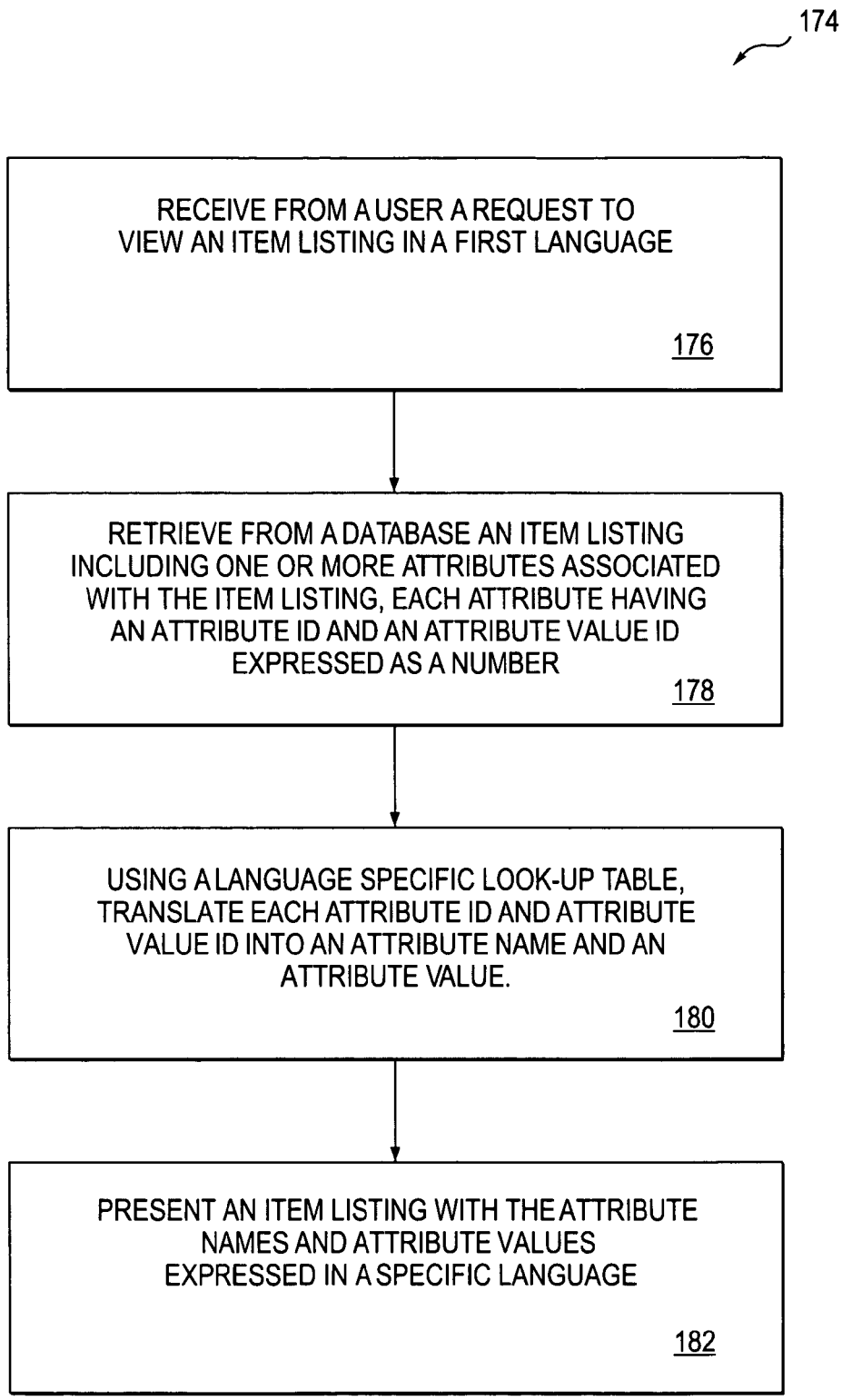
FIG. 11 illustrates a flowchart of the operations to display an item listing in a language independent manner according to one embodiment of the present invention.

FIG. 11 illustrates a flowchart of the operations to display an item listing in a language independent manner according to one embodiment of the present invention. At operation 176, a request to view a particular listing in a particular language is received. For one embodiment, the request is made by a user selecting a link on a web page to one item listing from a selection of item listings. At operation 178, the item listing that has been requested is retrieved from the sellers item listings database table 44. The listing has associated with it one or more attributes. Each of the attributes has an attribute name and an attribute value stored in the sellers item listings table 44 as an attribute ID and an attribute value ID respectively. For one embodiment the attribute ID and attribute value ID for each attribute are stored as numbers. Using a language-specific look-up table, at operation 180, the attribute ID and attribute value for each attribute associated with the item listing are converted to an attribute name and attribute value in the particular language that corresponds with the language-specific look-up table. For example, if the language-specific look-up table is an English look-up table, then the attribute ID and attribute value ID are converted to an attribute name and attribute value specified in English. At operation 182, the item listing is displayed to the user with attribute names and attribute values expressed in the same language as the language of the language-specific look-up table used to translate the attributes into attribute names and attribute values.

Figure 12:
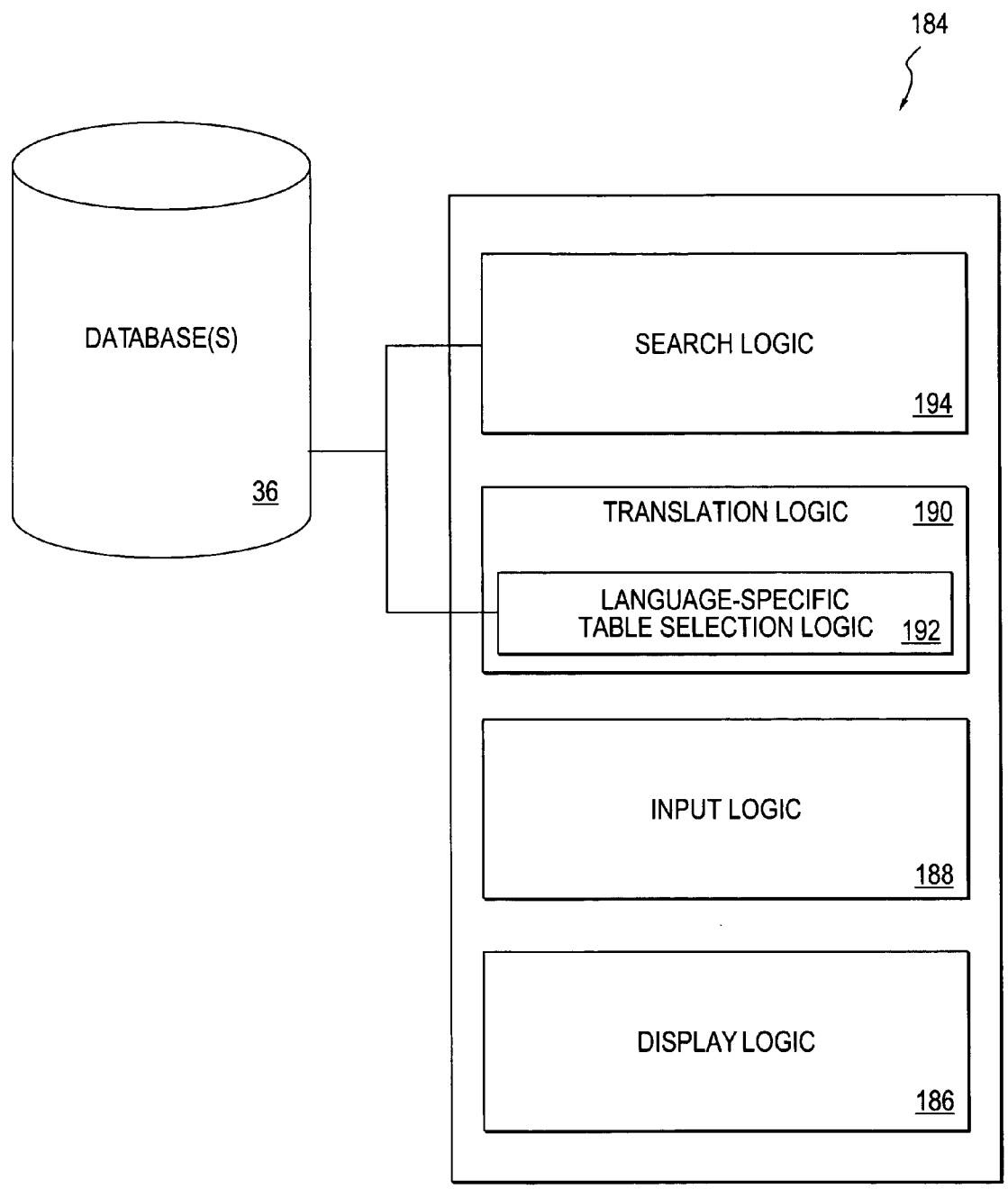
FIG. 12 illustrates a system for searching and displaying an item listing in a language independent manner according to one embodiment of the present invention.

FIG. 12 illustrates a system 184 for searching and displaying an item listing in a language independent manner according to one embodiment of the present invention. Accordingly, system 184 includes display logic 186, input logic 188, translation logic 190, language-specific table selection logic 190, and search logic 192.

For one embodiment of the invention, the display logic 184 provides the visual interface to the user. For example, the display logic 186 may facilitate the presentation of search attributes, including an attribute name and a selection of associated attribute values. In addition, for one embodiment of the invention, the display logic 186 may facilitate the presentation of item listings to the user.

For one embodiment of the invention, the input logic 188 serves as the input interface to receive input from a user. For example, the input logic 188 may include a combination of input interfaces and devices, such as a keyboard and/or a mouse pointing device. The input logic 188 of the system 184 may receive attribute value selections from a user for associated attribute names. Once an attribute value selection has been received, the input logic 188 may communicate the attribute value selection to the translation logic 190. The translation logic 190 may translate the attribute value and associated attribute name into symbols based on a language-specific look-up table. For example, the translation logic 190 may include language-specific table selection logic 194 to select a particular language-specific look-up table to use when performing the translation of attribute values and attribute names.

The system 184 also includes search logic 192 to search for items based on the translated attribute names and attribute values. For example, after the translation logic 190 has converted, or translated, one or more selected attribute values and associated names to symbols based on a language-specific look-up table, the search logic 192 performs a search of items stored in the database 36. For one embodiment of the invention, the search logic 192 facilitates a database search of the database using a query formulated in a standard query language.

Figure 13:
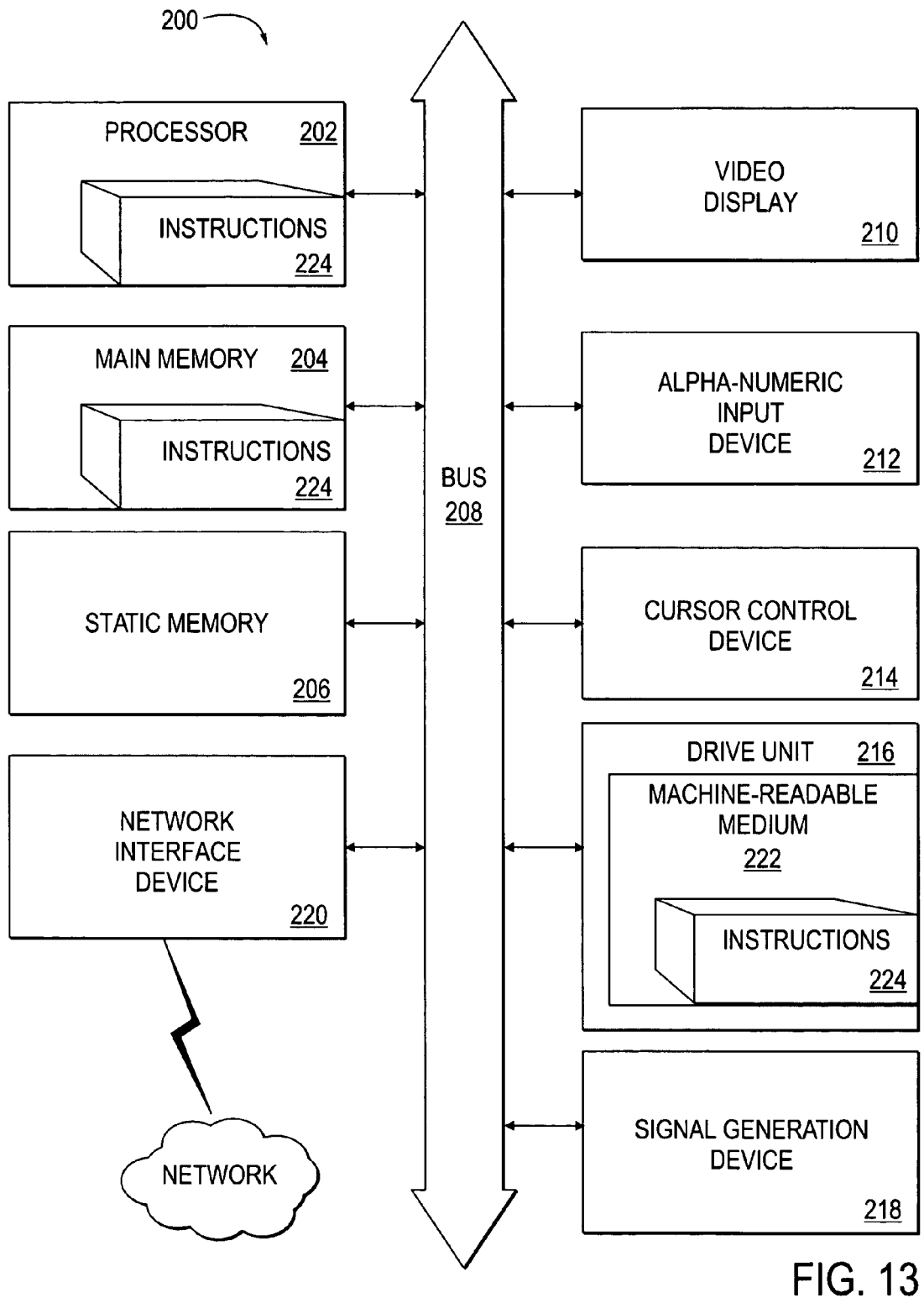
FIG. 13 is a diagrammatic representation of a machine in the exemplary form of a computer system within which a set of instructions, for causing the machine to perform any one of the methodologies discussed above, may be executed.

FIG. 13 shows a diagrammatic representation of a machine in the exemplary form of a computer system 200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or cathode ray tube (CRT). The computer system 200 also includes an alphanumeric input device 212 (e.g. a keyword), a cursor control device 214 (e.g. a mouse) a disk drive unit 216, a signal generation device 218 (e.g. a speaker) and a network interface device 220.

The disk drive unit 216 includes a machine-readable medium 222 on which is stored a set of instructions (software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" should be taken to any medium that is capable of storing, or encoding a sequence of instructions for execution by the machine and that cause the machine to perform any one or more of the methodologies of the present invention. The term "machine-readable medium" shall accordingly be taken to include, but not be limited to; solid-state memories, optical and magnetic media.

Thus, a method for searching in a language independent manner is provided with reference to specific exemplary embodiments. It will be evident that various modifications and changes may be made to these embodiments without departing from the broader spirit and scope of the invention. Accordingly, the specification and drawings are to be regarded in an illustrative rather than a restrictive sense. For example, while the present invention was described in the context of a network based commerce system having a structured database environment, the present invention is equally applicable to search engines in general.

What is claimed is:

1. A method comprising:
receiving at a server, for a plurality of item listings within a plurality of categories, item attributes expressed in a plurality of languages, each item attribute comprising an item attribute name and an item attribute value;
converting the item attribute names and the item attribute values of the item attributes from the plurality of languages into language-independent symbols and storing the item attributes for the plurality of item listings, expressed with the language-independent symbols, in an item listing table;
receiving, at the server, one or more search attributes expressed in a language that is different from one or more of the plurality of languages of the item attributes, each search attribute comprising a search attribute name and a search attribute value;
converting the search attribute name and the search attribute value of each of the one or more search attributes into the language-independent symbols;

performing a search within the item listing table to identify at least one item listing with one or more item attributes expressed in the language-independent symbols that match the one or more search attributes expressed in the language-independent symbols; and displaying the item attributes of the at least one identified item listing in the language in which the search attributes as received were expressed.

2. The method of claim 1, wherein the language-independent symbols comprise punctuations marks.

3. The method of claim 1, wherein converting the item attributes and the search attributes to language-independent symbols comprises using language-specific look-up tables.

4. The method of claim 1, further comprising, upon user selection of a selectable icon, changing the language in which the item attributes of the at least one identified item listing are displayed from the language in which the search attributes as received were expressed to the language in which the item attributes as received were expressed.

5. The method of claim 1, wherein the language-independent symbols comprise numbers.

6. The method of claim 1, further comprising using the language-specific look-up tables to convert the item attributes of the at least one identified item listing from the stored language-independent symbols into the language in which the search attributes as received were expressed.

7. A system comprising at least one server to:
receive, for a plurality of item listings within a plurality of categories, item attributes expressed in a plurality of languages, each item attribute comprising an item attribute name and an item attribute value;
convert the item attribute names and the item attribute values of the item attributes from the plurality of languages into language-independent symbols and store the item attributes for the plurality of item listings, expressed with the language-independent symbols, in an item listing table;
receive one or more search attributes expressed in a language that is different from one or more of the plurality of languages of the item attributes, each search attribute comprising a search attribute name and a search attribute value;
convert the search attribute name and the search attribute value of each of the one or more search attributes into the language-independent symbols;
perform a search within the item listing table to identify at least one item listing with one or more item attributes expressed in the language-independent symbols that match the one or more search attributes expressed in the language-independent symbols; and
display the item attributes of the at least one identified item listing in the language in which the search attributes as received were expressed.

8. The system of claim 7, wherein the language-independent symbols comprise punctuations marks.

9. The system of claim 7, wherein the server is configured to convert the item attributes and the search attributes to language-independent symbols using language-specific look-up tables.

10. The system of claim 7, wherein the server is further configured to change the language in which the item attributes of the at least one identified item listing are displayed, upon user selection of a selectable icon, from the language in which the search attributes as received were expressed to the language in which the item attributes as received were expressed.

11. The system of claim 7, wherein the language-independent symbols comprise numbers.

12. The system of claim 7, wherein the server is further configured to convert the item attributes of the at least one identified item listing from the stored language-independent symbols into the language in which the search attributes as received were expressed, using the language-specific look-up tables.

13. A non-transitory computer-readable medium having embedded therein a set of instructions which, when executed by one or more processors of a computer causes the computer to execute the following operations:
receive, for a plurality of item listings within a plurality of categories, item attributes expressed in a plurality of languages, each item attribute comprising an item attribute name and an item attribute value;
convert the item attribute names and the item attribute values of the item attributes from the plurality of languages into language-independent symbols and store the item attributes for the plurality of item listings, expressed with the language-independent symbols in an item listing table;
receive one or more search attributes expressed in a language that is different from one or more of the plurality of languages of the item attributes, each search attribute comprising a search attribute name and a search attribute value;
convert the search attribute name and the search attribute value of each of the one or more search attributes into the language-independent symbols;
perform a search within the item listing table to identify at least one item listing with one or more item attributes expressed in the language-independent symbols that match the one or more search attributes expressed in the language-independent symbols; and
provide a signal for displaying the item attributes of the at least one identified item listing in the language in which the search attributes as received were expressed language.

14. The computer-readable medium of claim 13, wherein the language independent symbols comprise punctuation marks.

15. The computer-readable medium of claim 13, wherein the instructions cause the computer to convert the item attributes and the search attributes to language-independent symbols using language-specific look-up tables.

16. The computer-readable medium of claim 13, wherein the instructions cause the computer to change the language in which the item attributes of the at least one identified item listing are displayed, upon user selection of a selectable icon, from the language in which the search attributes as received were expressed to the language in which the item attributes as received were expressed.

17. The computer-readable medium of claim 13, wherein the language-independent symbols comprise numbers.

18. The computer-readable medium of claim 13, wherein the instructions further cause the computer to convert the item attributes of the at least one identified item listing from the stored language-independent symbols into the language in which the search attributes as received were expressed, using the language-specific look-up tables.

* * * * *